(12) United States Patent
Narine et al.

(10) Patent No.: US 10,047,313 B2
(45) Date of Patent: Aug. 14, 2018

(54) CERTAIN TRIACYLGLYCEROLS AS CRYSTALLIZATION DEPRESSANTS

(71) Applicant: TRENT UNIVERSITY, Peterborough (CA)

(72) Inventors: Suresh Narine, Peterborough (CA); Laziz Bouzidi, Peterborough (CA); Athira Mohanan, Peterborough (CA)

(73) Assignee: Trent University, Peterborough, Ontario (CA)

( * ) Notice: Subject to any disclaimer, the term of this patent is extended or adjusted under 35 U.S.C. 154(b) by 29 days.

(21) Appl. No.: 15/337,500

(22) Filed: Oct. 28, 2016

(65) Prior Publication Data

US 2017/0121623 A1   May 4, 2017

Related U.S. Application Data

(60) Provisional application No. 62/247,645, filed on Oct. 28, 2015.

(51) Int. Cl.
| | | |
|---|---|---|
| *C10L 10/14* | (2006.01) | |
| *C10L 1/02* | (2006.01) | |
| *C10L 1/19* | (2006.01) | |

(52) U.S. Cl.
CPC ............. *C10L 10/14* (2013.01); *C10L 1/026* (2013.01); *C10L 1/191* (2013.01); *C10L 2200/0476* (2013.01); *C10L 2270/026* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,203,585 B1* | 3/2001 | Majerczak | ............. | C10L 1/143 44/388 |
| 2013/0269241 A1* | 10/2013 | Narine | ...................... | C10L 1/19 44/308 |

OTHER PUBLICATIONS

Hoekman SK, Broch A, Robbins C, Ceniceros E, Natarajan M. Review of biodiesel composition, properties, and specifications. Renew Sust Energ Rev. 2012; 16(1):143-169.
Dunn RO. Cold-Flow Properties of Soybean Oil Fatty Acid Monoalkyl Ester Admixtures. Energy Fuel. 2009; 23(8):4082-4091.
De Torres M, Jiménez-Osés G, Mayoral JA, Pires E. Fatty acid derivatives and their use as CFPP additives in biodiesel. Bioresour Technol. 2011; 102(3)1590-2594.
Dunn RO. Effects of minor constituents on cold flow properties and performance of biodiesel. Prog Energ Combust. 2009; 35(6):481-489.

(Continued)

*Primary Examiner* — Ellen McAvoy
*Assistant Examiner* — Chantel Graham
(74) *Attorney, Agent, or Firm* — Bereskin & Parr, LLP/S.E.N.C.R.L.; Michael Fenwick

(57) ABSTRACT

This application relates to the polymorphism and microstructure of certain triacylglycerols and fatty acid methyl esters, including 1,2-dioleoyl-3-stearoyl glycerol and methyl stearate, and how the properties of these individual components in a biodiesel fuel, as well as their combined mixtures, helps understand the fundamental mechanisms of their crystallization so as to design biodiesel fuels with improved low temperature characteristics.

12 Claims, 15 Drawing Sheets

(56) References Cited

OTHER PUBLICATIONS

Figure 1A:
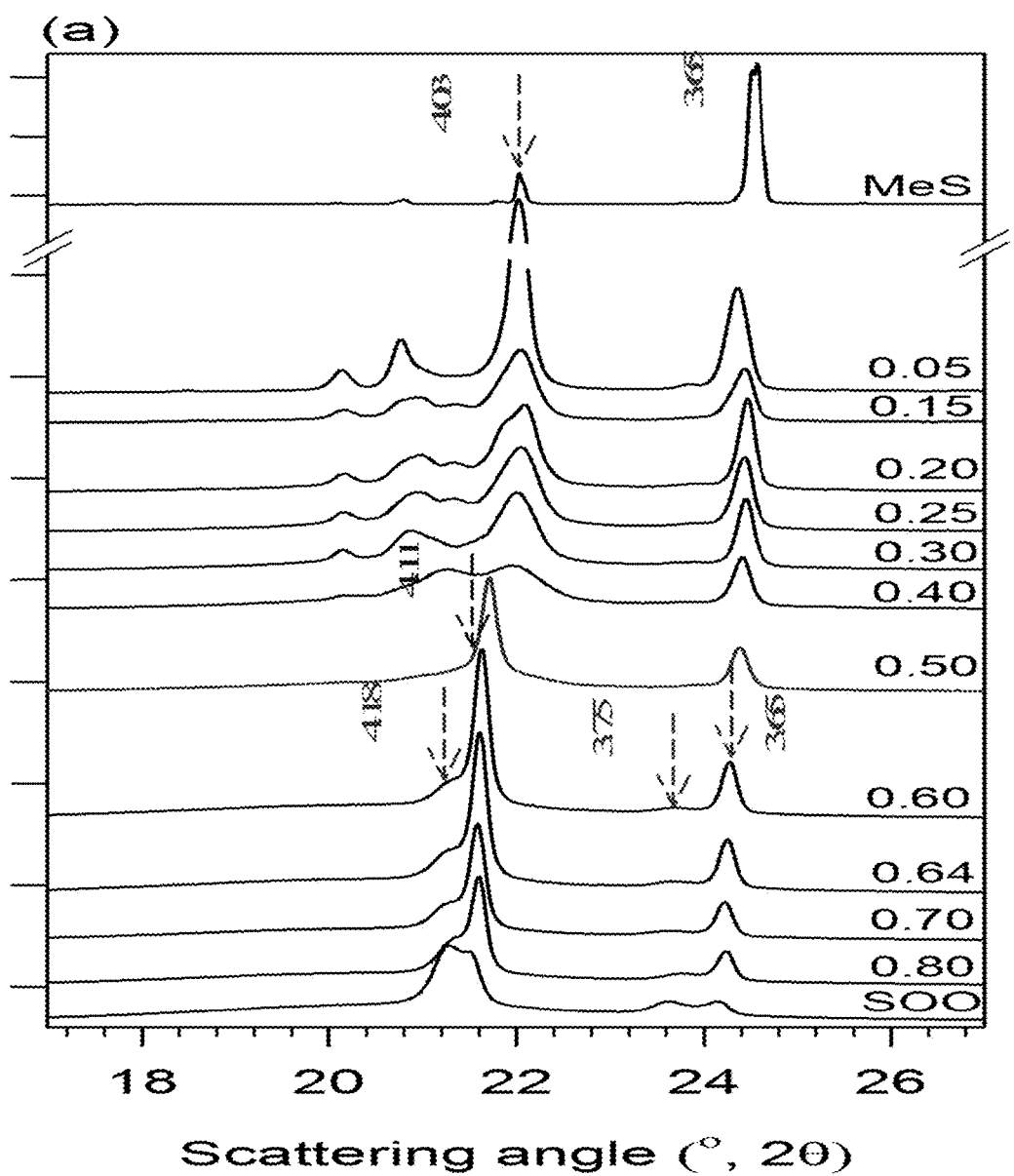

Misra RD, Murthy MS. Blending of additives with biodiesels to improve the cold flow properties, combustion and emission performance in a compression ignition engine—A review. Renew Sust Energ Rev. 2011; 15(5)1413-2422.

Smith PC, Ngothai Y, Dzuy Nguyen Q, O'Neill BK. Improving the low-temperature properties of biodiesel: Methods and consequences. Renew Energy. 2010; 35(6):1145-1151.

Mohanan A, Bouzidi L, Li S, Narine SS. Mitigating crystallization of saturated FAMES in biodiesel: 1. Lowering the crystallization temperature via addition of metathesized soybean oil. Energy. vol. 96, 2016, pp. 335-345.

Sato K, Ueno S, Yano J. Molecular interactions and kinetic properties of fats. Progr Lipid Res. 1999; 38(1):91-116.

Marangoni AG. The nature of fractality in fat crystal networks. Trends Food Sci Technol. 2002; 13(2):37-47.

Chandran DV, Bhatnagar RK. A method for synthesis of $\mathsf{L}$-monoricinolein. J Am Oil Chem Soc. 1968; 45(8):581-582.

Bentley PH, McCrae W. Efficient synthesis of symmetrical 1,3-diglycerides. J Org Chem. 1970; 35(6):2082-2083.

Minato A, Ueno S, Yano J, Smith K, Seto H, Amemiya Y, et al. Thermal and structural properties of sn-1,3-dipalmitoyl-2-oleoylglycerol and sn-1,3-dioleoyl-2-palmitoylglycerol binary mixtures examined with synchrotron radiation X-ray diffraction. J Am Oil Chem Soc. 1997; 74(10):1213-20.

Costa MC, Boros LAD, Coutinho JAP, Krahenbuhl MA, Meirelles AJA. Low-Temperature Behavior of Biodiesel: Solid-Liquid Phase Diagrams of Binary Mixtures Composed of Fatty Acid Methyl Esters. Energy Fuels. 2011; 25(7):3244-3250.

Inoue T, Hisatsugu Y, Ishikawa R, Suzuki M. Solid-liquid phase behavior of binary fatty acid mixtures: 2. Mixtures of oleic acid with lauric acid, myristic acid, and palmitic acid. Chem Phys Lipids. 2004; 127(2):161-173.

Abes M, Bouzidi L, Narine SS. Crystallization and phase behavior of 1,3-propanediol esters II. 1,3-Propanediol distearate/1,3-propanediol dipalmitate (SS/PP) and 1,3-propanediol distearate/1,3-propanediol dimyristate (SS/MM) binary systems. Chem Phys Lipids. 2007; 150(1):89-108.

Costa MC, Rolemberg MP, Boros LAD, Krähenbühl MA, de Oliveira MG, Meirelles AJA. Solid-Liquid Equilibrium of Binary Fatty Acid Mixtures. J Chem Eng Data. 2007; 52(1) 30-36.

Boodhoo MV, Kutek T, Filip V, Narine SS. The binary phase behavior of 1,3-dimyristoyl-2-stearoyl-sn-glycerol and 1,2-dimyristoyl-3-stearoyl-sn-glycerol. Chem Phys Lipids. 2008; 154(1):7-18.

Boodhoo MV, Bouzidi L, Narine SS. The binary phase behavior of 1, 3-dipalmitoyl-2-stearoyl-sn-glycerol and 1, 2-dipalmitoyl-3-stearoyl-sn-glycerol. Chem Phys Lipids. 2009; 160(1):11-32.

Hildebrand JH. Solubility XII. Regular solutions. J Am Chem Soc. 1929; 51:66-80.

Bragg WL, Williams EJ. The effect of thermal agitation on atomic arrangement in alloys. Proc R Soc. 1934; 145(855):699-730.

Boodhoo MV, Bouzidi L, Narine SS. The binary phase behavior of 1,3-dicaproyl-2-stearoyl-sn-glycerol and 1,2-dicaproyl-3-stearoyl-sn-glycerol. Chem Phys Lipids. 2009; 157(1):21-39.

Bouzidi L, Boodhoo MV, Kutek T, Filip V, Narine SS. The binary phase behavior of 1,3-dilauroyl-2-stearoyl-sn-glycerol and 1,2-dilauroyl-3-stearoyl-sn-glycerol. Chem Phys Lipids. 2010; 163(6):607-29.

Tenchov BG. Non-uniform lipid distribution in membranes. Prog Surf Sci. 1985; 20(4):273-340.

Lee AG. Lipid Phase-Transitions and Phase-Diagrams .2. Mixtures Involving Lipids. Biochim Biophys Acta. 1977b; 472(3-4):285-344.

Bragg WL, Williams EJ. The effect of thermal agitation on atomic arrangement in alloys. Proc R Soc A. 1934; 145(855):699-730.

Narine SS, Marangoni AG. Microscopic and rheological studies of fat crystal networks. J Cryst Growth. 1999; 198-199 (2):1315-1319.

Martini S, Herrera M. Practical considerations in nucleation studies: The polarized light microscopy technique. J Am Oil Chem Soc. 2002; 79(4):411-412.

Ghotra BS, Dyal SD, Narine SS. Lipid shortenings: a review. Food Res Inter. 2002; 35(10):1015-1048.

Fahey DA, Small DM, Kodali DR, Atkinson D, Redgrave TG. Structure and polymorphism of 1,2-dioleoyl-3-acyl-sn-glycerols—3-layered and 6-layered structures. Biochemistry. 1985; 24(14):3757-3764.

Mykhaylyk OO, Smith KW, Martin CM, Ryan AJ. Structural models of metastable phases occurring during the crystallization process of saturated/unsaturated triacylglycerols. J Appl Crystallogr. 2007; 40(s1):s297-s302.

Dorset DL. From waxes to polymers—crystallography of polydisperse chain assemblies. Struct Chem. 2002; 13(3):329-337.

Ikeda E, Ueno S, Miyamoto R, Sato K. Phase Behavior of a Binary Mixture of 1,3-Dipalmitoyl-2-oleoyl-sn-glycerol and 1,3-Dioleoyl-2-palmitoyl-sn-glycerol in n-Dodecane Solution. J Phys Chem B. 2010; 114(34)10961-10969.

Bayes-Garcia L, Calvet T, Cuevas-Diarte MA, Ueno S, Sato K. Heterogeneous microstructures of spherulites of lipid mixtures characterized with synchrotron radiation microbeam X-ray diffraction. Cryst Eng Comm. 2011; 13(22):6694-6705.

Minato A, Ueno S, Smith K, Amemiya Y, Sato K. Thermodynamic and kinetic study on phase behavior of binary mixtures of POP and PPO forming molecular compound systems. J Phys Chem B. 1997; 101(18)3498-3505.

Minato A, Yano J, Ueno S, Smith K, Sato K. FT-IR study on microscopic structures and conformations of POP-PPO and POP-OPO molecular compounds. Chem Phys Lipids. 1997; 88(1):63-71.

Bayes-Garcia L, Calvet T, Cuevas-Diarte MA, Ueno S, Sato K. In situ synchrotron radiation X-ray diffraction study of crystallization kinetics of polymorphs of 1,3-dioleoyl-2-palmitoyl glycerol (OPO). Cryst Eng Comm. 2011; 13(10):3592-3599.

\* cited by examiner

FIG. 4A   FIG. 4B   FIG. 4C
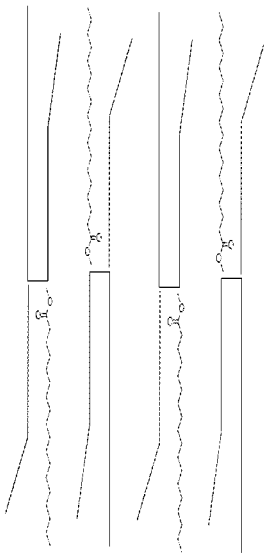
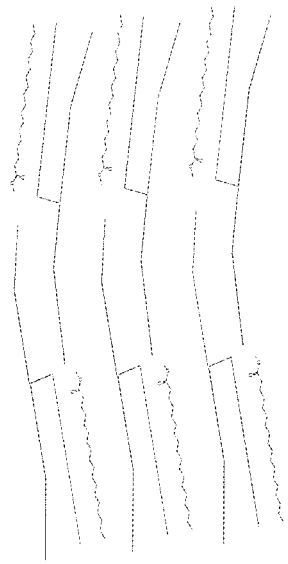
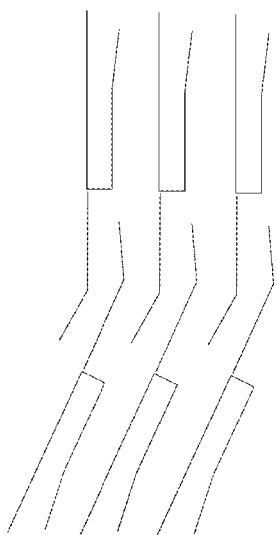

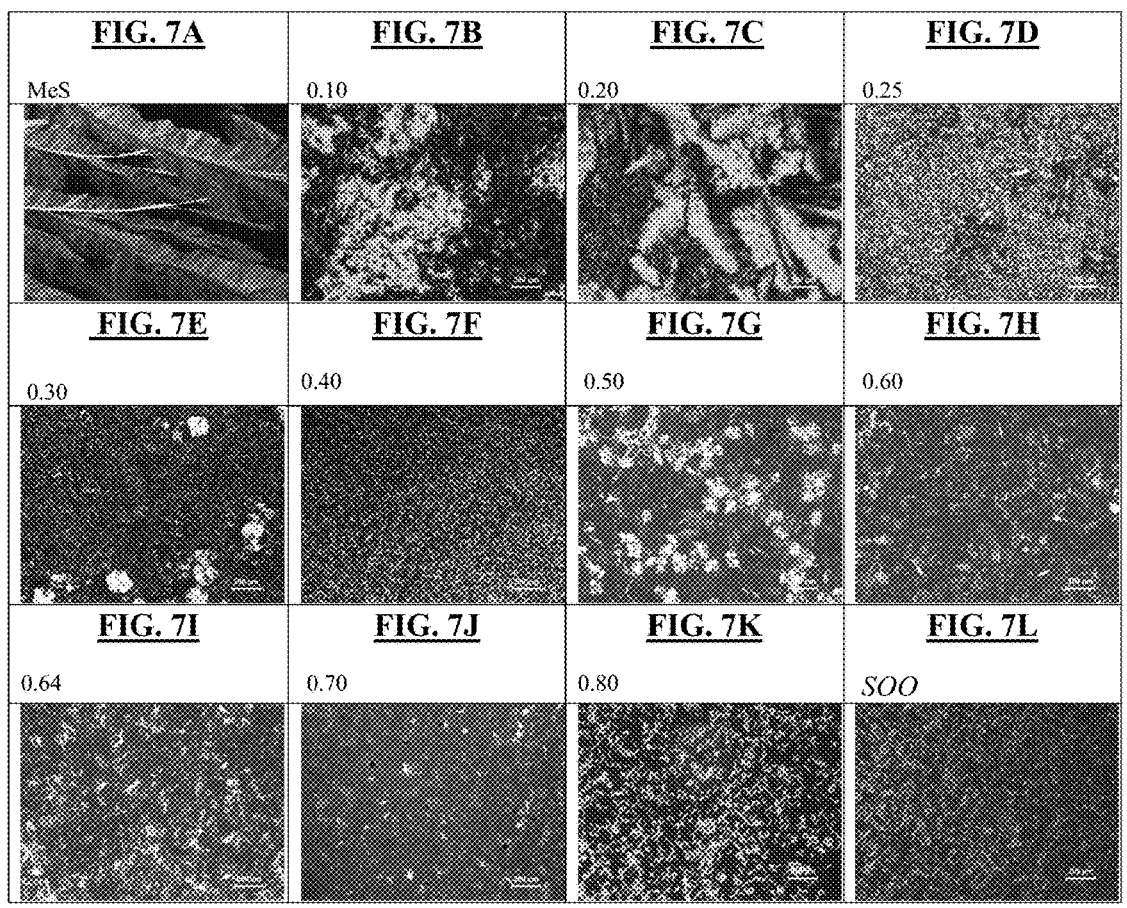

CERTAIN TRIACYLGLYCEROLS AS CRYSTALLIZATION DEPRESSANTS

CROSS-REFERENCE TO RELATED APPLICATIONS

The present application claims the benefit of priority from U.S. provisional application No. 62/247,645 filed on Oct. 28, 2015, the contents of which are incorporated herein by reference in their entirety.

FIELD

This application relates to the polymorphism and microstructure of certain triacylglycerols and fatty acid methyl esters, including 1,2-dioleoyl-3-stearoyl glycerol and methyl stearate, and how the properties of these individual components in a biodiesel fuel, as well as their combined mixtures, helps understand the fundamental mechanisms of their crystallization so as to design biodiesel fuels with improved low temperature characteristics.

INTRODUCTION

Diesel fuels and/or biodiesel fuels typically contain wax, and when subjected to low temperatures, these fuels often undergo wax crystallization, gelling and/or viscosity increase. This reduces the ability of the fuel to flow and creates filter plugging which adversely affects the operability of vehicles using these fuels. Flow improvers have been used to modify the wax structure as it builds during cooling. These additives are typically used to keep the wax crystals small so that they can pass through fuel filters. Also, pour point dispersants are sometimes used in diesel fuel to ensure that it can be pumped at low temperatures.

Due to environmental concerns and the decline of known petroleum reserves with subsequent price increases of petroleum, biodiesel fuels are becoming a focus of intense research and development efforts. Biodiesel fuels typically comprise fatty acid esters, prepared for example by transesterifying triglycerides with lower alcohols, e.g. methanol or ethanol. A typical biodiesel fuel is the fatty acid ester of a natural oil (i.e. rapeseed oil or of soybean oil, as non-limiting examples), and can be used in a given jurisdiction if it meets specifications mandated by national or regional standards, such as ASTM D6751 in the United States or EN 14214 standards in Europe. One of the major problems associated with the use of biodiesel is its poor cold flow properties resulting from crystallization of saturated fatty compounds in cold conditions, as indicated by its relatively high cloud points (CP) and pour points (PP). For example, soybean oil and palm oil biodiesels present CPs of ~0° C. and 15° C., respectively, whereas, No. 1 diesel has a CP of about −40° C. Furthermore, biodiesel tends to have a narrow range of temperatures between CP and PP, adding to its cold flow problems. Heaters and insulators may be installed along the fuel line and storage facilities to allow its use at temperatures lower than the CP or PP, but this incurs additional costs. A 20° C. reduction in cold filter plugging point is necessary for some biodiesel fuels to find utility in colder climates such as those of North America and Europe in winter.

Several efforts to mitigate the low-temperature problems of biodiesel have been investigated over the past several years. Many popular approaches have included blending biodiesel with conventional diesel fuel, winterization, and use of synthetic additives. Also, studies have been performed to show the diversification in the feedstock and genetic modification of the feedstock, aimed to provide a reduction in the saturated content of the fatty acid methyl esters (FAME) in biodiesel as well as modification of FAME composition/profile of the fuels. While there have been efforts to create additives that may reduce the PP and cold filter plugging point (CFPP) of fuels, many are not cost effective. Also, increasing the unsaturated content of biodiesel may improve its cold flow properties, but also leads to the alteration of the oxidative stability of the fuel. The overall thermal behavior of biodiesel is affected by the relative concentration of its saturated and unsaturated FAME components. The cold flow issue is primarily a multifaceted problem of crystallization (of saturated FAMEs) in solution (unsaturated FAMEs) which can be approached from several angles.

Several approaches have been tried to improve the cold-weather performance of biodiesel. Some approaches are fundamentally targeted at modifying composition or/and structure, or at altering the crystallization behavior of the biodiesel by additives. The appropriate adjustment of the molecular composition of biodiesel is in principle a straightforward method that would beneficially impact the crystallization parameters. For example, although at the cost of a yield loss, CP and/or PP can be significantly reduced by simple processing methods, such as "winterization" which reduces the long chain FAMEs content, the main culprit for the early crystallization of biodiesel. Also, a biodiesel that is relatively rich in low melting temperature compounds can be produced by chemically reacting the lipid feedstock with an alcohol producing fatty acid esters other than methanol. These modification methods however are either generally not efficient or expensive, or both.

Several approaches have been utilized to lower the onset temperature of crystallization of biodiesel, targeting particularly the saturated FAMEs such as methyl palmitate (MeP) and methyl stearate (MeS), which influence most of its flow behavior at low temperature.

Application of cold flow improver (CFI) additives is the most popular approach used to treat biodiesel. CFI additives are designed to lower the temperature characteristics of biodiesel such as CP and PP by disrupting the crystallization process at as many length scales as possible from nucleation and crystalline growth to agglomeration. The existing CFI additives can be classified into two large categories: (i) crystallization modifiers which affect one or more phases of the crystallization process, and (ii) pour point depressants (PPDs) which function as crystal growth limiters. Unfortunately, no one single approach has yet been able to simultaneously address both PP and CP effectively. Additives that are capable of altering both nucleation and growth are preferred as they can delay crystallization and reduce the size of the crystals. Notice that most commercially available additives are designed specifically for petro-diesel and do not work as well for biodiesel because of this specificity requirement.

SUMMARY

TAGs and oligomers of TAGs with two fatty acids in the cis-configuration and a fatty acid in the trans-configuration or a saturated fatty acid were shown to have the required properties for reducing crystallization temperature of biodiesels. In one aspect, the TAG is SOO (1,2-dioleoyl-3-stearoyl glycerol) and the FAME is MeS (methyl stearate).

In one aspect of the disclosure, there is included a biodiesel crystallization depressant composition comprising a triacylglycerol comprising 1,2-dioleoyl-3-stearoyl glycerol wherein the 1,2-dioleoyl-3-stearoyl glycerol is mixed with a biodiesel fuel comprising methyl stearate to a desired molar fraction, $X_{SOO}$, where X ranges from 0 to 1.0, and further wherein the 1,2-dioleoyl-3-stearoyl glycerol begins crystallization depression from inception of addition down to a maximum at molar fraction $0.70_{SOO}$.

In another aspect, the present disclosure includes a biodiesel crystallization depressant composition comprising (i) a triacylglycerol comprising 1,2-dioleoyl-3-stearoyl glycerol and (ii) a biodiesel fuel comprising methyl stearate, wherein the components are present in a desired molar fraction, $X_{SOO}$, where X ranges from 0 to 1.0, and further wherein the 1,2-dioleoyl-3-stearoyl glycerol begins crystallization depression from inception (for example, $0.01_{SOO}$) to a maximum at molar fraction of $0.70_{SOO}$.

The present disclosure also includes a method for reducing the crystallization temperature of a biodiesel fuel, the method comprising, combining or mixing a triacylglycerol comprising 1,2-dioleoyl-3-stearoyl glycerol and the biodiesel fuel comprising methyl stearate, at a desired molar fraction, $X_{SOO}$, where X ranges from 0 to 1.0, and further wherein the 1,2-dioleoyl-3-stearoyl glycerol begins crystallization depression from inception of addition down to a maximum at molar fraction $0.70_{SOO}$.

The phase behavior of SOO/MeS was examined in detail with x-ray diffraction (XRD), polarized light microscopy (PLM) and differential scanning calorimetry (DSC). Also, a complete phase diagram including phase transition boundaries, polymorphism and phase structures, and microstructure development was established for the SOO/MeS system. The liquidus line in the phase diagram obtained upon heating was modeled using so-called Bragg-William approximation, a thermodynamic model based on the Hildebrand equation and taking into account non-ideality of mixing.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

Figure 1B:
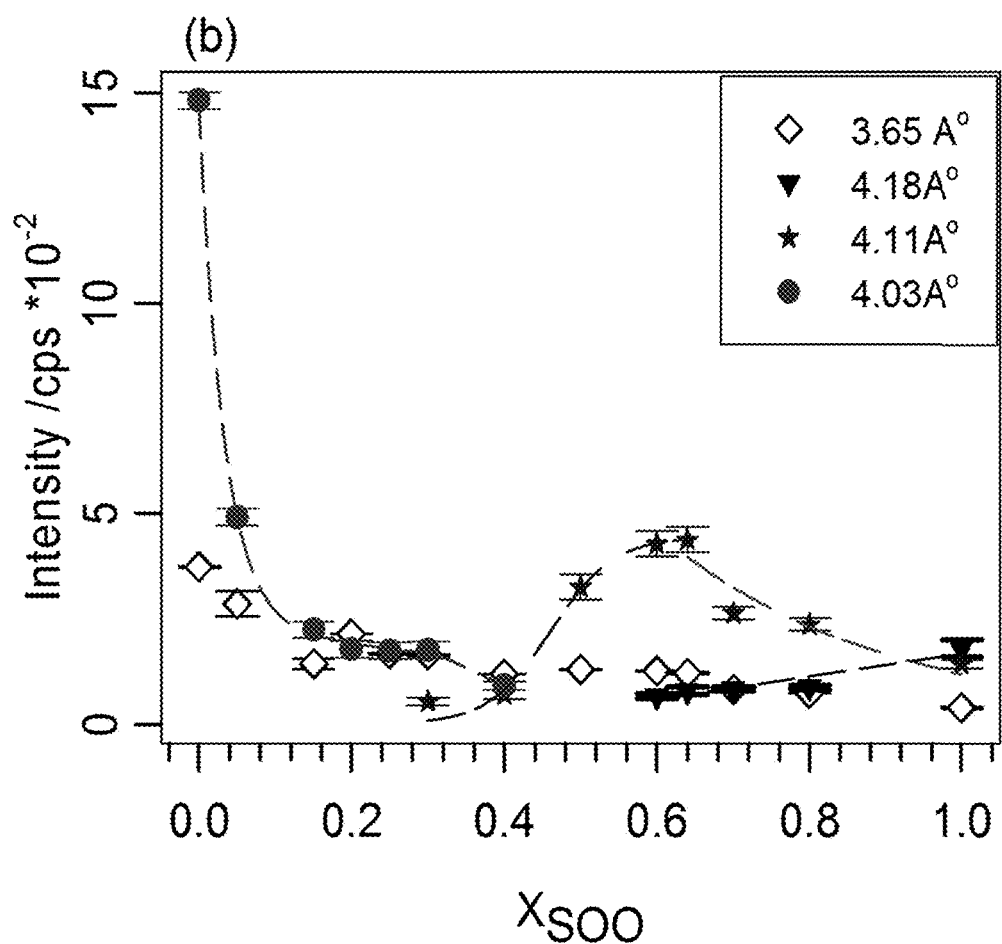

The embodiments of the application will now be described in greater detail with reference to the attached drawings in which:

FIG. 1A depicts WAXD spectra of a TAG and biodiesel mixture measured at −40° C., after cooling (1° C./min) from the melt. The selected peaks are specified with their d-spacing (in Å) and indicated with arrows in FIG. 1A. FIG. 1B depicts the intensity of selected reflections characteristic of the different phases occurring in a TAG and biodiesel mixture.

Figure 2A:
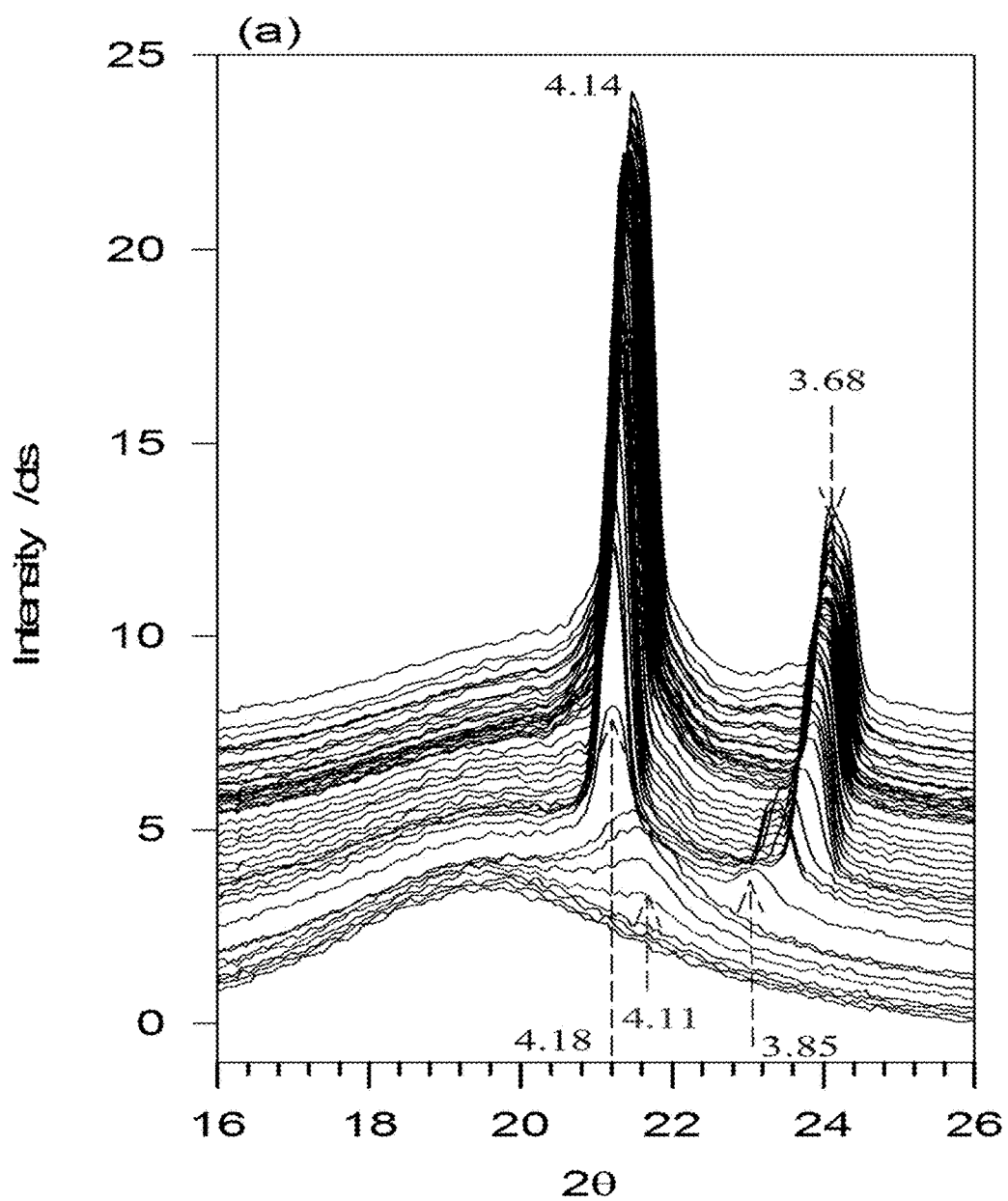
Figure 2B:
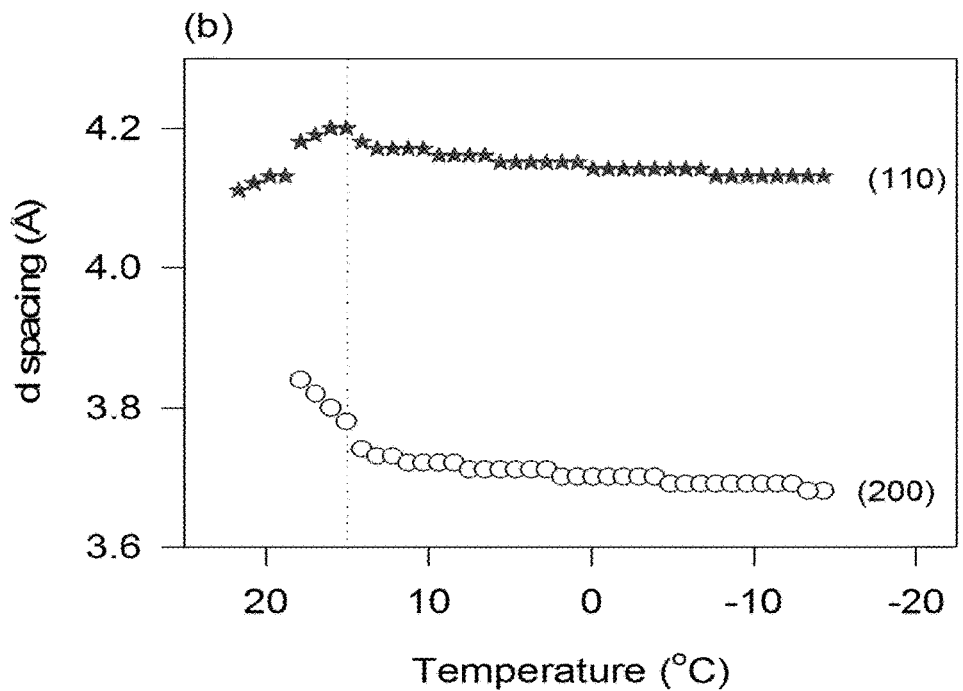
Figure 2C:
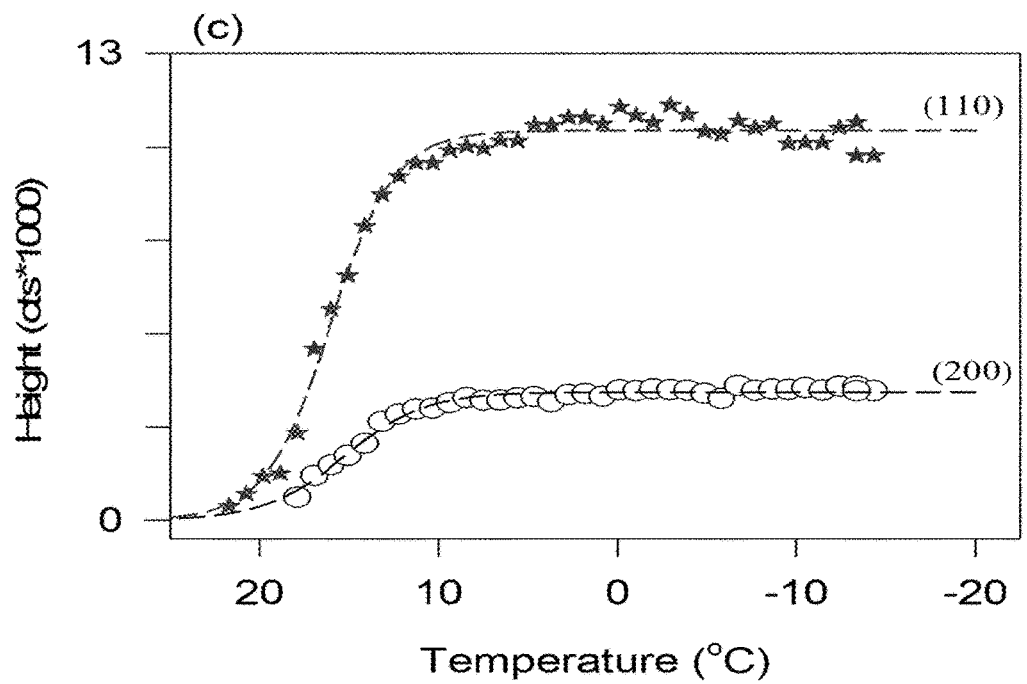

FIG. 2A depicts temperature resolved (from 27° C. to −20° C.) WAXD of $0.50_{SOO}$ obtained while cooling from the melt at 1° C./min. FIG. 2B depicts d spacing of the WAXD peaks. FIG. 2C depicts intensity versus temperature curves of the WAXD peaks.

Figure 3A:
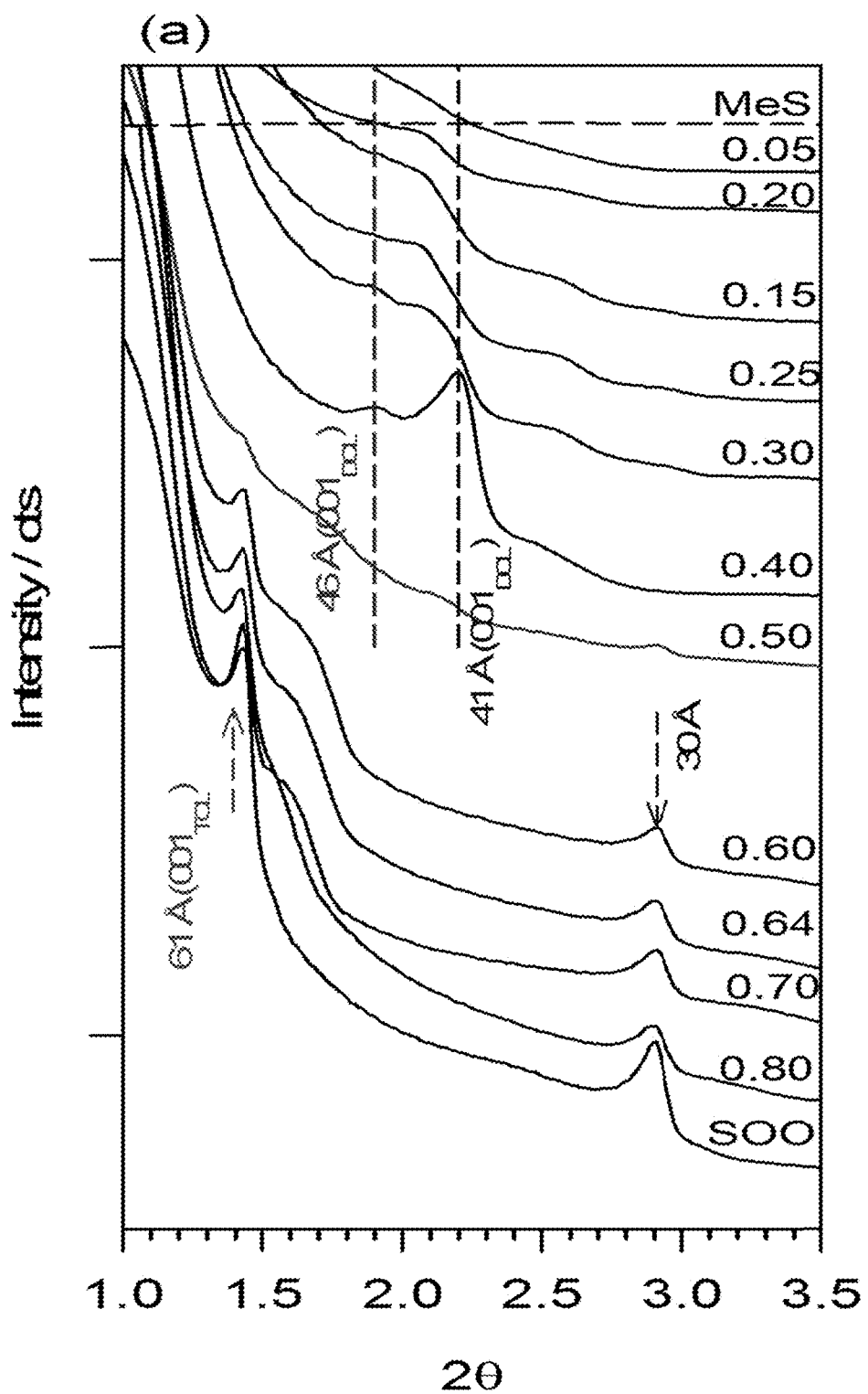
Figure 3B:
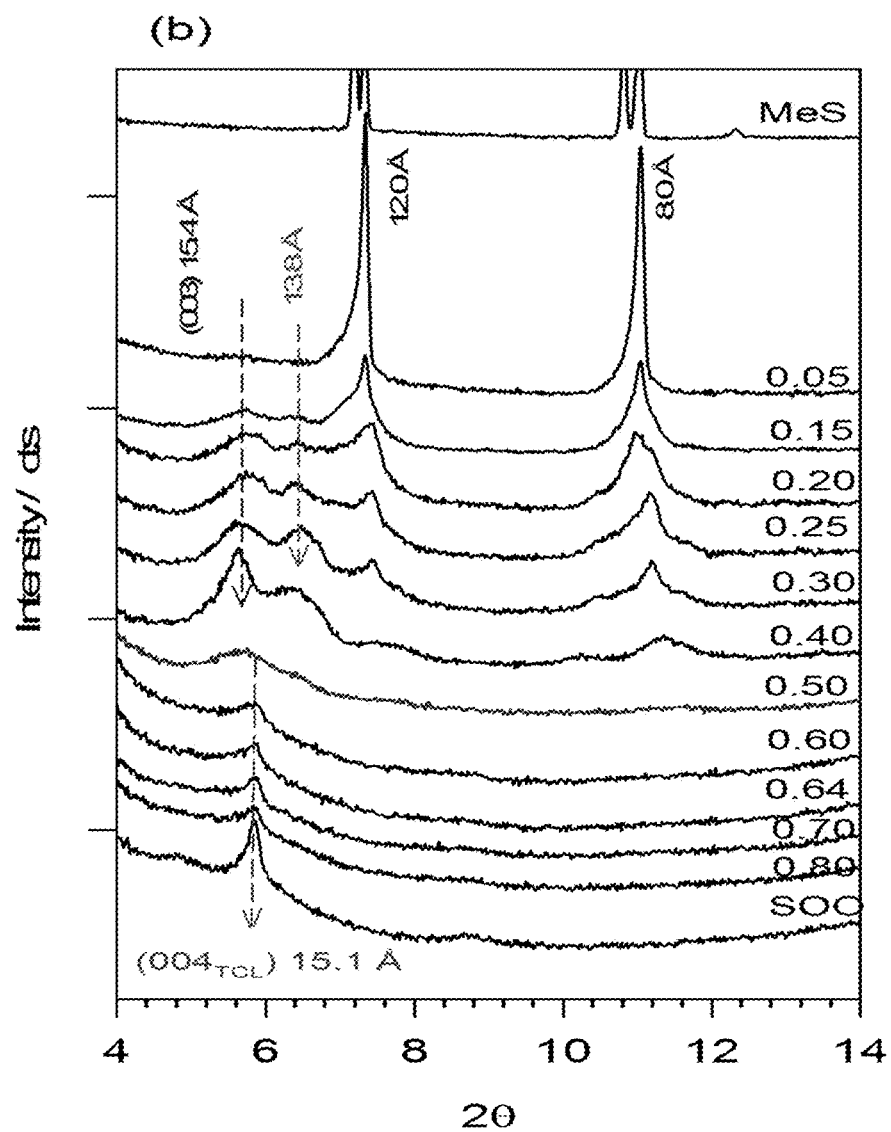
Figure 3C:
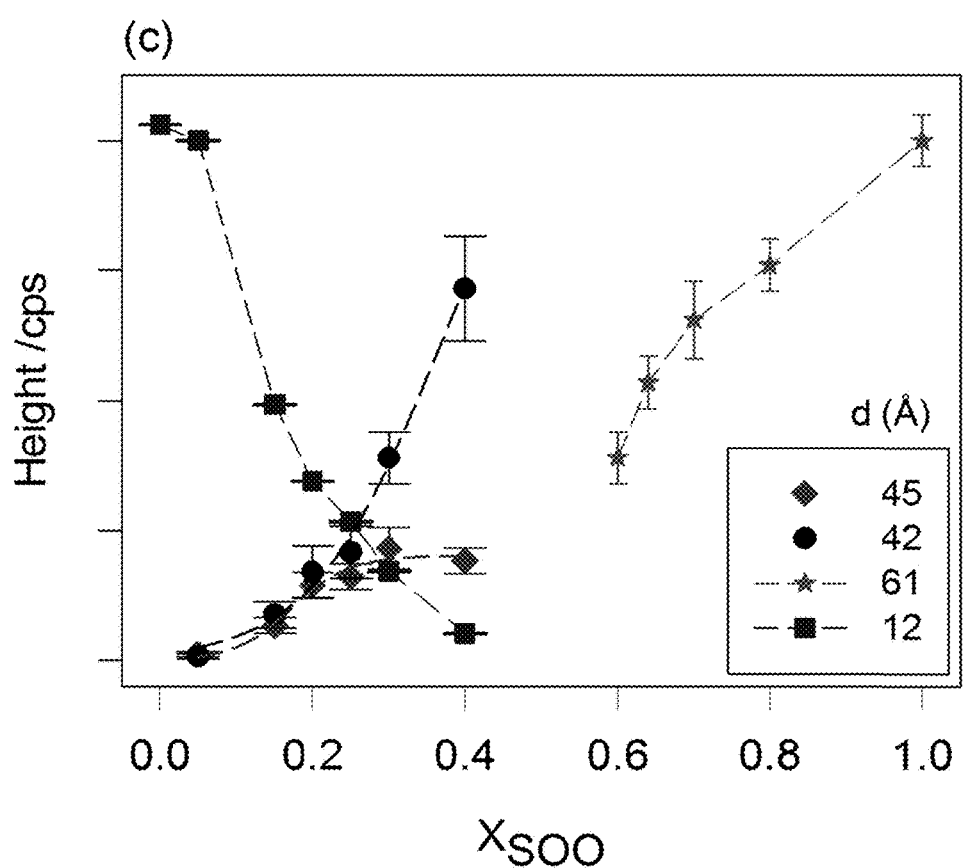

FIG. 3A depicts the SAXD of a TAG and biodiesel mixture taken at −40° C., after cooling from the melt at 1° C./min. FIG. 3B depicts the intensity of selected SAXD reflections. FIG. 3C shows the intensity of selected SAXD peaks.

FIG. 4A depicts possible lamellar structures of a TAG and biodiesel mixture in the DCL. FIG. 4B depicts possible lamellar structures of a TAG and biodiesel mixture in the TCL. FIG. 4C depicts a pure TAG in the TCL structure.

Figure 5A:
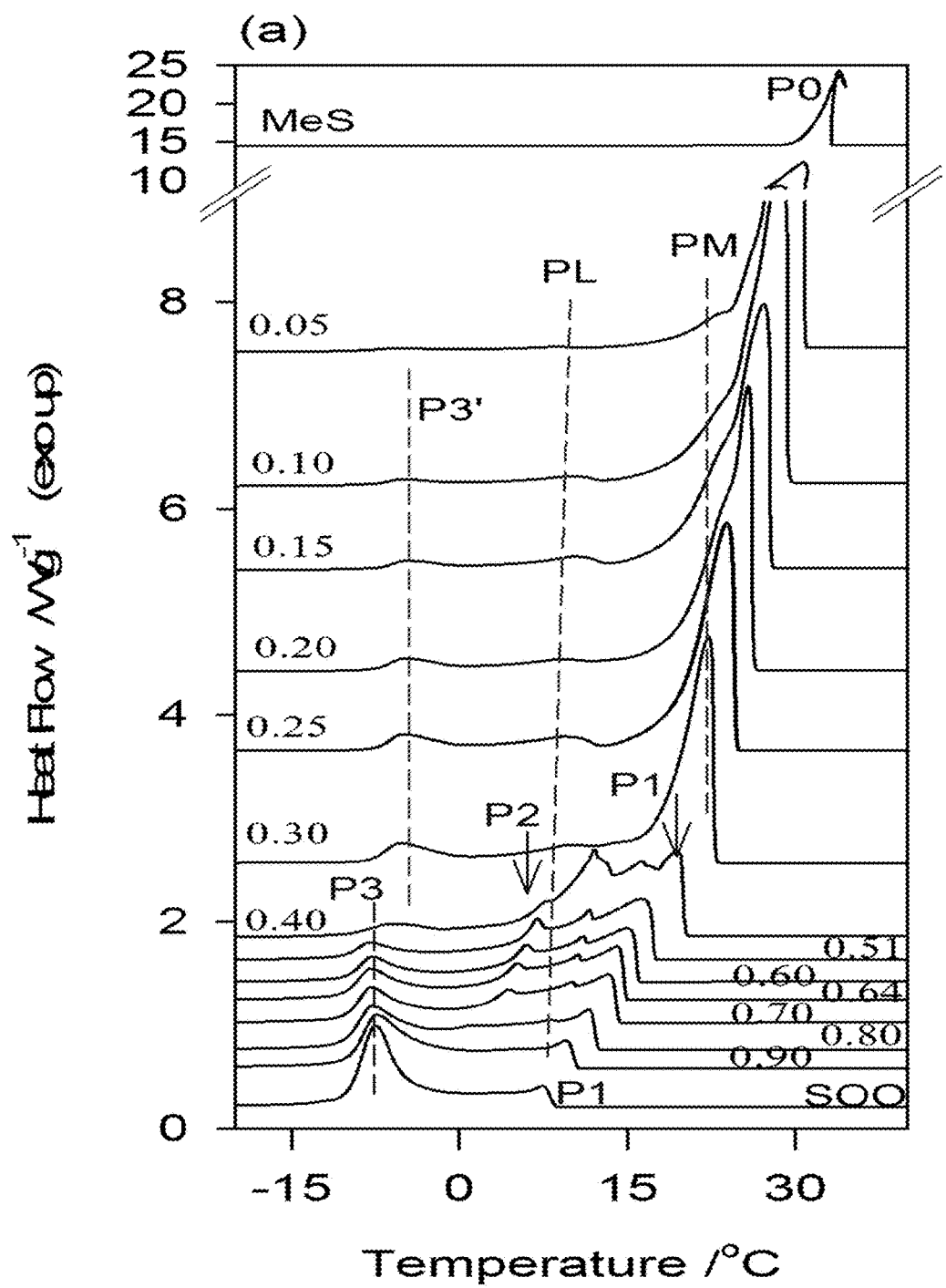
Figure 5B:
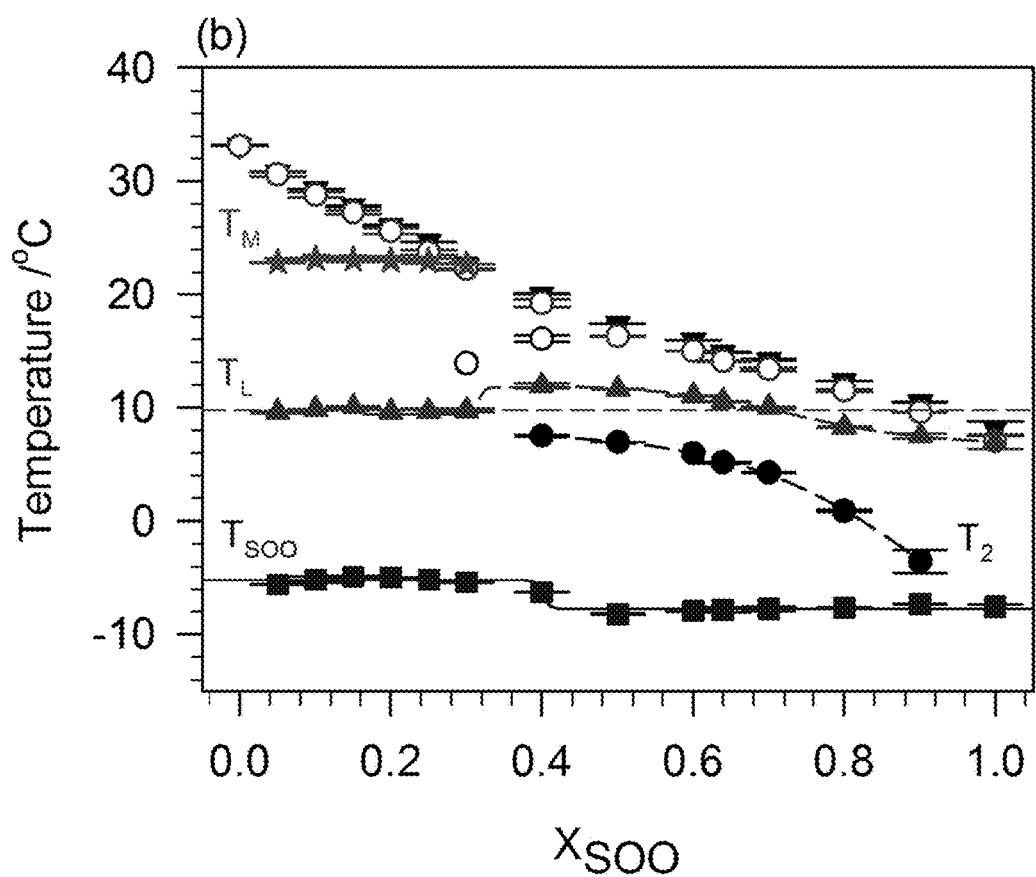
Figure 5C:
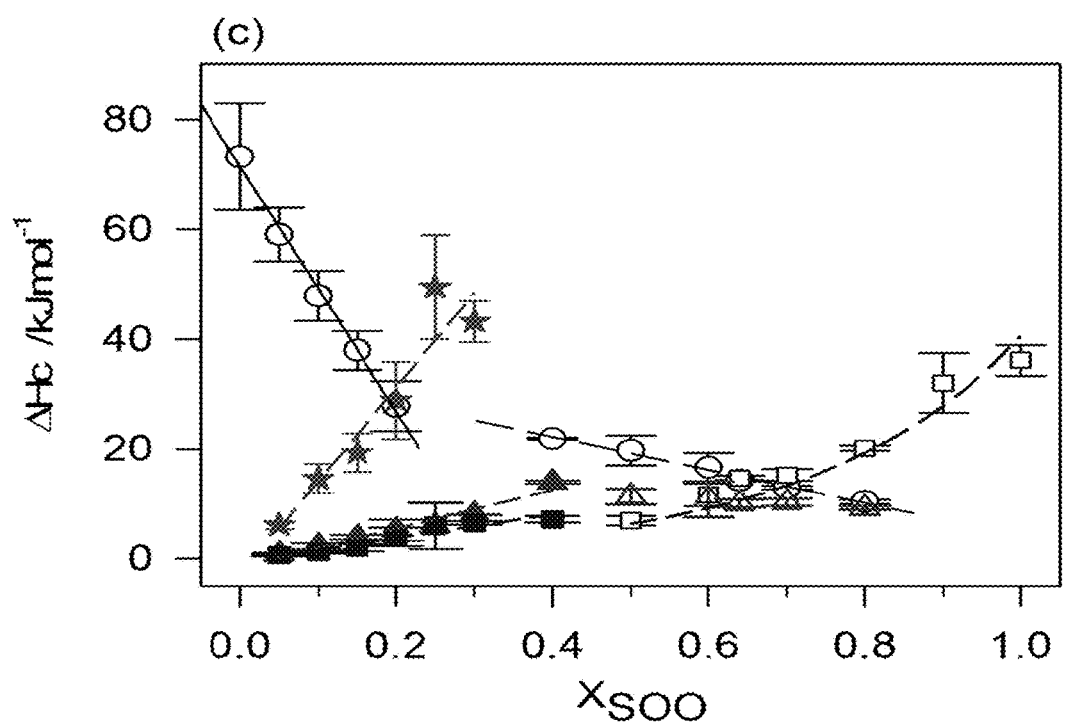

FIG. 5A depicts a cooling (5° C./min) thermogram of a TAG and biodiesel mixture. FIG. 5B depicts characteristic temperatures of crystallization of a TAG and biodiesel mixture. FIG. 5C depicts enthalpy associated with individual exotherms (P0 to P3). For FIGS. 5A, 5B, and 5C, onset temperature of crystallization: $T_{On}$, offset temperature of crystallization $T_{Off}$ and Peak temperature: $T_P$). Open circles, P0 and P1; stars: PM; up triangles: PL; squares: P3'; empty triangles: P2; empty squares: P3.

Figure 6A:
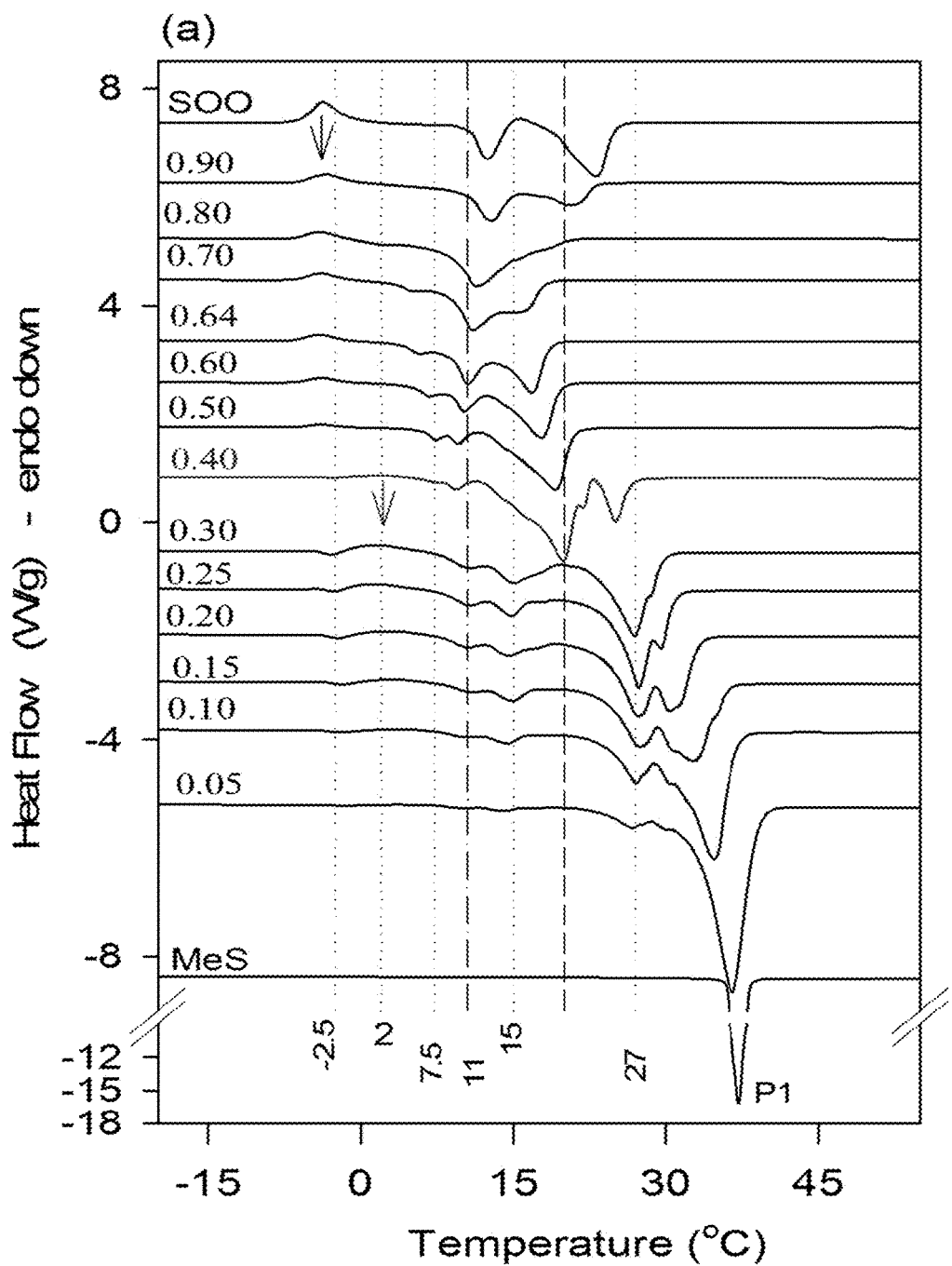
Figure 6B:
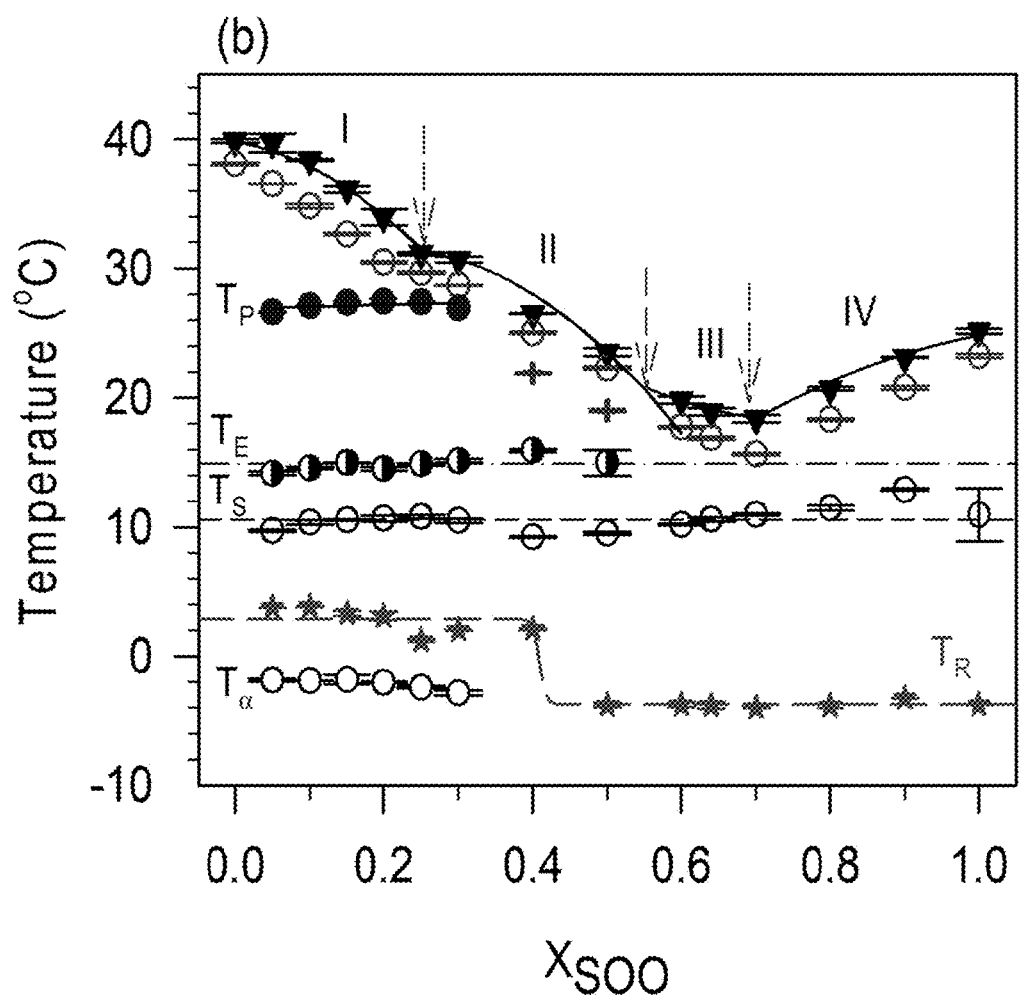

FIG. 6A depicts heating (5° C./min) thermograms of a TAG and biodiesel mixture. TAG molar fraction is reported on the left side of each curve. FIG. 6B depicts characteristic transition temperatures of a TAG and biodiesel mixture. For FIGS. 6A and 6B, symbols represent: offset temperature of melting, $T_{Off}$: ▼, Peak temperature of last endotherm, $T_{P1}$: ○, and peak temperature of intermediary transformations $T_P$: ○, and recrystallization temperature: ★

FIGS. 7A-L depicts PLM of a TAG and biodiesel mixture taken at −90° C. The SOO molar ration is reported on the top of the PLM images. FIG. 7A shows PLM image of MeS. FIGS. 7B-7K show PLM image of MeS and SOO at varying ratios. FIG. L shows PLM image of SOO.

Figure 8:
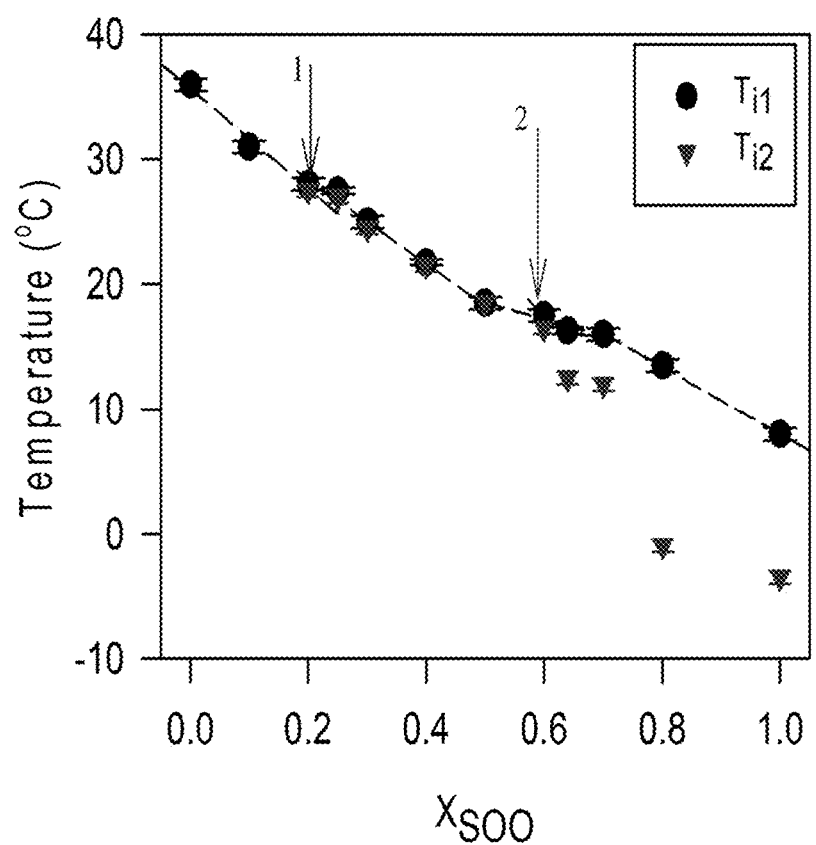

FIG. 8 depicts PLM induction temperature of different mixtures obtained upon cooling from the melt at 1° C./min. $T_{i1}$ and $T_{i2}$ are the temperature at which the first and second microstructures were observed first. The dashed line is a guide for eye.

DESCRIPTION OF VARIOUS EMBODIMENTS (I) Definitions

Unless otherwise indicated, the definitions and embodiments described in this and other sections are intended to be applicable to all embodiments and aspects of the present application herein described for which they are suitable as would be understood by a person skilled in the art.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this application and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation from 0% to at least ±5% of the modified term if this deviation would not negate the meaning of the word it modifies.

The present description refers to a number of chemical terms and abbreviations used by those skilled in the art. Nevertheless, definitions of selected terms are provided for clarity and consistency.

As used in this application, the singular forms "a", "an" and "the" include plural references unless the content clearly dictates otherwise. For example, an embodiment including "the polymer" should be understood to present certain aspects with one polymer or two or more additional polymers.

The term "and/or" as used herein means that the listed items are present, or used, individually or in combination. In effect, this term means that "at least one of" or "one or more" of the listed items is used or present.

(II) Compositions of the Disclosure

It is generally known that additives suppress the crystallization of biodiesel and delays the rate of nucleation and/or crystal growth processes. At the nucleation level, additives delay the formation of critical nuclei from embryo clusters through molecular-level interactions between the crystallizing host molecules and the interfering additive molecules. The crystal growth is delayed when the additive prevents the adsorption and incorporation of crystallizing host molecules at the growing crystal surfaces. The additive is most efficient when both length scales are impacted. The disturbance to crystallization is therefore manifested at both the nanostructure and microstructure levels. The changes may be evidenced depending on concentration by specific changes to crystal structure and polymorphism, and microstructure, i.e., fat network and crystal shape and habit.

The present disclosure relates to triacylglycerols and oligomers of triacylglycerols having two fatty acids in the cis-configuration and a third fatty acid in the trans-configuration or a saturated fatty acid as crystallization depressants in biodiesel fuels. In one embodiment, without being bound by theory, the geometry of the TAGs suggests a simple mechanism of action of the molecules wherein while the straight chain moiety promotes a first packing with the linear saturated components of the biodiesel fuel, such as FAME, the kinked chains prevent further crystallization due to geometric steric hindrances.

In one aspect of the disclosure, there is included a biodiesel crystallization depressant composition comprising a triacylglycerol comprising 1,2-dioleoyl-3-stearoyl glycerol wherein the 1,2-dioleoyl-3-stearoyl glycerol is mixed with a biodiesel fuel comprising methyl stearate to a desired molar fraction, $X_{SOO}$, where X ranges from 0 to about 1.0, and further wherein the 1,2-dioleoyl-3-stearoyl glycerol begins crystallization depression from inception of addition down to a maximum at molar fraction of about $0.70_{SOO}$.

In another embodiment, the mixture of the 1,2-dioleoyl-3-stearoyl glycerol and the methyl stearate comprises one eutectic at about $0.70_{SOO}$, one peritectic about $0.25_{SOO}$ and a singularity indicative of a 1:1 compound mixture at about $0.54_{SOO}$.

In one embodiment, the mixture of the 1,2-dioleoyl-3-stearoyl glycerol and the methyl stearate comprises a eutectic at molar fraction about $0.70_{SOO}$, wherein an average crystal size is less than about 20 μm at about $0.70_{SOO}$.

In one embodiment, the mixture of the 1,2-dioleoyl-3-stearoyl glycerol and the methyl stearate comprises a peritectic at molar fraction about $0.25_{SOO}$, wherein an average crystal size is less than about 250 μm at about $0.25_{SOO}$.

In one embodiment, at a molar fraction of about $0.70_{SOO}$, the composition begins crystallization at about 15° C. and completes crystallization at about −17° C.

In one embodiment, from molar fraction about $0.05_{SOO}$ to molar fraction about $0.50_{SOO}$ the mixture of the 1,2-dioleoyl-3-stearoyl glycerol and the methyl stearate comprises monoclinic and orthorhombic forms.

In another embodiment, the monoclinic form decreases from molar fraction of about $0.05_{SOO}$ to disappear at molar fraction of about $0.50_{SOO}$.

In another embodiment, from molar fraction of about $0.50_{SOO}$ to molar fraction of about $1.0_{SOO}$ the mixture of the 1,2-dioleoyl-3-stearoyl glycerol and the methyl stearate comprises orthorhombic forms wherein the content of the orthorhombic forms increase to a maximum at the eutectic composition at molar fraction of about $0.70_{SOO}$.

In one embodiment, at the eutectic at molar fraction of about $0.70_{SOO}$, the mixture of the 1,2-dioleoyl-3-stearoyl glycerol and the methyl stearate comprises a fibril-like crystal network.

In one embodiment, at the peritectic at molar fraction of about $0.25_{SOO}$, the mixture of the 1,2-dioleoyl-3-stearoyl glycerol and the methyl stearate comprises granular microstructure with distorted spherulitic entities.

In one embodiment, at a 1:1 compound mixture, the mixture forms a network made of fibril-like and spherulitic entities.

In another aspect, the present disclosure includes a biodiesel crystallization depressant composition comprising (i) a triacylglycerol comprising 1,2-dioleoyl-3-stearoyl glycerol and (ii) a biodiesel fuel comprising methyl stearate, wherein the components are present in a desired molar fraction, $X_{SOO}$, where X ranges from 0 to about 1.0, and further wherein the 1,2-dioleoyl-3-stearoyl glycerol begins crystallization depression from inception (for example, about $0.01_{SOO}$) to a maximum at molar fraction of about $0.70_{SOO}$.

The present disclosure also includes a method for reducing the crystallization temperature of a biodiesel fuel, the method comprising, combining or mixing a triacylglycerol comprising 1,2-dioleoyl-3-stearoyl glycerol and the biodiesel fuel comprising methyl stearate, at a desired molar fraction, $X_{SOO}$, where X ranges from 0 to about 1.0, and further wherein the 1,2-dioleoyl-3-stearoyl glycerol begins crystallization depression from inception of addition down to a maximum at molar fraction of about $0.70_{SOO}$.

EXAMPLES

The following non-limiting examples are illustrative of the present application:

Polarized Light Microscopy (PLM) is an efficient technique to study the microstructure of lipid systems. The development of fat crystals from the start of crystallization to the complete fat network can be exposed by time/temperature resolved PLM, or thermo-microscopy. The technique also allows access to nucleation parameters when the rate of nucleation is low or the rate of crystal formation (number of crystals per time) is low, i.e., when individual crystals can be individually counted and considered as nuclei.

X-Ray Diffraction (XRD) is a useful tool for studying crystallization at the molecular and nanoscale levels. It allows access to the details of the lamellar packing, as well as the subcell structure of the fat crystals, and provides information on the intermolecular interactions at play during the development of the crystal phases. XRD also provides valuable information on the crystal arrangement, homogeneity and order state at the crystallized domains which are usually at the nanoscale. The technique provides access to the electronic density map which in turn provides an indication of the localization of atoms/group of atoms. This can be used to understand the molecular mechanisms involved in the crystallization of TAG and biodiesel systems, and can help unravel the role of TAGs in the noticeable reduction of crystallization temperature of biodiesels, such as FAMEs.

The present effort investigated the polymorphism and microstructure of TAGs and a biodiesel fuel, such as the SOO/MeS binary system, in order to determine the effect of positional isomerism. The phase behavior of SOO/MeS was examined in detail with x-ray diffraction (XRD), polarized light microscopy (PLM) and differential scanning calorimetry (DSC). Also, a complete phase diagram including phase transition boundaries, polymorphism and phase structures, and microstructure development was established for the SOO/MeS system. The liquidus line in the phase diagram obtained upon heating was modeled using so-called Bragg-William approximation, a thermodynamic model based on the Hildebrand equation and taking into account non-ideality of mixing.

Example 1—Materials and Methods of Preparation of SOO and/or MeS

Materials 1,2-dioleoyl-3-stearoyl glycerol (SOO) was synthesized and purified and Methyl Stearate (MeS) was purchased (Sigma Aldrich Chemical Co. Inc., Oakville, Ontario). Their purities were greater than 99% as determined by high performance liquid chromatography (HPLC). The purity of MeS was confirmed by GC-FID. The sample was run as is in chloroform, using a Zebron Capillary GC (ZB-5HT Inferno) column (Phenomenex, Torrance Calif., USA). SOO purity was determined by a Waters HPLC system (Alliance e2695 Milford, Mass.) fitted with a Waters ELSD 2424 evaporative light scattering detector. The SOO and MeS were mixed in the desired molar fractions at 0.05 molar fraction increments ($X_{SOO}$=0, 0.05, 0.10, 0.20, 0.30, 0.40, 0.50, 0.60, 0.70, 0.80, 0.90 and 1.00), then heated to 80° C. and stirred for 5 min to ensure complete homogeneity. The samples were stored at 4° C.

Differential Scanning Calorimetry

The thermal transition behavior of the SOO/MeS mixtures was investigated by differential scanning calorimetry (DSC). The measurements were carried out on a Q200 model (TA Instruments, New Castle, Del.) under a nitrogen flow of 50 mL/min. The sample (~4.0 to 6.0±0.1 mg) in a hermetically sealed aluminum pan was first equilibrated at 90° C. for 5 min, a temperature and a time over which crystal memory was erased, and then cooled at 5° C./min down to −90° C. The sample was held at −90° C. for 5 min, and then subsequently reheated to 90° C. at 5.0° C./min to obtain the melting profiles. All measurement temperatures were reported to a certainty of better than ±0.5° C. The "TA Universal Analysis" software was used to analyze the data and extract the main characteristics of the peaks. The positions of non-resolved thermal events were estimated using the first and second derivatives of the differential heat flow, and their other characteristics were simply estimated using the software elements.

Polarized Light Microscopy

A Leica DM2500P (Leica Microsystems, Wetzlar, Germany) fitted with a Leica DFC420C digital camera was used for the microstructure studies. A Linkam LS 350 temperature-controlled stage (Linkam Scientific Instruments, Tadworth, Surrey, UK) fitted to the PLM was used to process thermally the samples. A small droplet of material was carefully pressed between a preheated glass microscope slide and cover-slip ensuring a uniform thin layer of sample. The sample was melted at 90° C. for 5 min to delete all crystal memory then cooled down to −90° C. at 1° C./min. The temperature at which the first "white spot" was observed in the PLM was recorded as the induction temperature of crystallization ($T_i$). Temperature resolved images were measured at 100× magnification during cooling using the automatic multi-time image capture feature available in the PLM. The final crystal network was imaged at 50×, 100× and 500× magnification.

X-Ray Diffraction

X-ray diffraction measurements were performed on a PANalytical Empyrean apparatus (PANalytical B. V., Lelyweg, The Netherlands) equipped with a filtered Cu—$K_\alpha$ radiation source and with the PANalytical PIXcel$^{3D}$ detector used in line-scanning mode. The XRD patterns were recorded between 1 and 60° (2θ) in 0.013° steps, at 45 kV and 40 mA. The procedure was automated and controlled by PANalytical Data Collector (V 3.0c) software. The sample was processed in the XRD chamber, similarly to PLM as described in section 2.2.3, using a 700 Series Cryostream Plus cooling system (Oxford Cryosystems, Oxford, UK) fitted to the diffractometer. The temperature was controlled to better than ±0.5° C. The data were processed and analyzed using the PANalytical X'PertHighScore V3.0 software. We refer to the range 2θ=[0-15]° and [15-30]° as the small- and wide-angle scattering regions (SAXD and WAXD), respectively.

X-Ray Data Analysis and Polymorphism

The main subcell hydrocarbon-chain packing modes were commonly denoted as the α, β' and β polymorphs. The chain packing of the α-polymorph was hexagonal with non-specific chain-chain interactions. The common subcell packing of the β'-polymorph was orthorhombic, and the hydrocarbon chains of the β-polymorph were ordinarily packed in a triclinic (or monoclinic, if the angles α and γ are 90°) parallel subcell ($T_H$). The β-polymorph was the most stable crystal form, with the highest melting temperature, and the α-polymorph was the least stable crystal form, with the lowest melting temperature. The hydrocarbon chain layering was responsible for the characteristic small-angle (long-spacing) reflections. The period of layers normally observed for TAG structures was usually proportional to the acyl chain lengths by a factor of two or three, suggesting a double-chain length (DCL) or a triple-chain length (TCL) packing. Note that the first order reflection ($d_{001}$) represented the thickness of the molecular layers and the higher order reflections ($d_{00l}$, l=2, 3, ... ) indicated regular, periodic structures, and represent the periodical sequence of electronic density differences in multiple layers.

Thermodynamic Analysis of the Boundaries in the Phase Diagram

The pseudo-equilibrium phase diagram of the SOO/MeS binary system was constructed using the data generated in the DSC heating experiments. The liquidus line was generated by the offset temperature of melting, a point that is suitable for studying equilibrium properties because it is determined by the most stable crystal. It was simulated using a simple thermodynamic model based on the Hildebrand equation coupled with the Bragg-William approximation for non-ideality of mixing. The Bragg-William approximation is commonly used to investigate the miscibility of lipid mixtures. In this model, the deviation from an ideal behavior is described by a non-ideality of mixing parameter, ρ (J/mol), defined as the difference in the energy of mixed-pairs (A-B) and the average pair interaction energy between like pairs (A-A and B-B) formed in the mixture:

$$\rho = z\left(u_{AB} - \frac{u_{AA} + u_{BB}}{2}\right) \quad (1)$$

where z is the first coordination number, $u_{AB}$, $u_{AA}$ and $u_{BB}$ the interaction energies for AB, AA and BB pairs, respectively.

The Hildebrand equation is simply modified by introducing an extra energy term, which accommodates the extra entropy in mixing due to non-ideality of mixing (Eq 2):

$$\ln X_S + \frac{\rho(1 - X_S)^2}{RT} = -\frac{\Delta H_S}{R}\left(\frac{1}{T} - \frac{1}{T_S}\right) \quad (2)$$

For ideal mixing, the intermolecular interaction of like-pairs is equal to that of mixed-pairs and consequently ρ=0 and the Hildebrand equation is obtained. A negative ρ is obtained when the formation of AB pairs is energetically more favorable than AA or BB pairs and reflects a tendency for order. A positive ρ is obtained when mixed-pair formation is energetically less favorable and reflects a tendency of like molecules to cluster, which beyond some critical value leads to phase separation. A more detailed description is reported in a previous contribution Example 2—Crystal Structure of SOO/MeS Mixtures Wide Angle X-Ray Diffraction and Subcell Structure The WAXD patterns of the SOO/MeS mixtures measured at −40° C. after cooling from the melt at 1° C./min are shown in FIG. 1A. The intensity of selected reflections in the WAXD region are presented in FIG. 1B. As can be seen, a background halo indicative of the presence of a liquid or amorphous phase was still present in the patterns even at −40° C., particularly in the SOO-rich mixtures. This contribution was systematically subtracted before the analysis of the patterns and determination of the crystal phases.

The XRD pattern of MeS perfectly matched the diffraction powder file of its monoclinic structure (labeled $\beta_M$) published by the International Center for Diffraction Data (ICDD) and assigned to a monoclinic crystal structure (PDF, reference No 00-032-1764). The peaks at 4.25 Å, 4.03 Å and 3.63 Å of pure MeS are assigned to the ($\bar{6}$ 1 1), ($\bar{10}$ 1 1) and (1 2 1) planes, respectively.

Pure SOO presented four peaks in the WAXD pattern (at 4.18 Å, 4.11 Å, 3.75 Å and 3.65 Å in FIG. 1A) indicative of two orthorhombic subcell structures. The coexistence of such dual phases is common in asymmetric unsaturated TAGs like SOO. Temperature resolved WAXD (TR-WAXD, not shown) of SOO cooled at 1° C./min revealed that a first phase is a very loose hexagonal structure (very wide peak at 4.18 Å) reminiscent of the least stable phase known for SOO, the $\alpha_2$-phase, which started to crystallize at ~−5° C. This phase transformed gradually into a more stable orthorhombic structure (appearance of the 200 peak at 3.85 Å) at −1° C. The crystal grew and ordered upon cooling further, as indicated by the steady increase of the intensity of the reflection from (200) plane and decrease of its d-spacing (3.75 Å in the most organized crystal). This phase of SOO is known as the $\alpha_1$-phase. The second phase also started at ~−1° C. in the hexagonal subcell structure with a shoulder peak at 4.11 Å indicative of the $\alpha_2$-phase of SOO, and then transformed below −9° C. to an orthorhombic phase having a 200 reflection at 3.65 Å characteristic a β'-phase rather than a pseudo α-phase.

The addition of SOO to MeS triggered the formation of new phases at very low loading. As soon as SOO was added, new reflections at 4.11, and 4.18 Å started to appear at the detriment of those of the pure MeS phase. The presence of these reflections along with the peak at 3.65 Å is indicative of the formation of new orthorhombic phases. They are attributed to mixed MeS/SOO phases. Their peaks were relatively wider than those of pure SOO indicating that the phases induced by SOO were less ordered and have smaller coherence lengths. In fact, as indicated by the intensity of the signature peaks of MeS (see the 4.03 Å curve, circles in FIG. 1B), the pure MeS phase decreased exponentially and disappeared completely in the $0.50_{SOO}$ mixture.

The $0.50_{SOO}$ mixture presented peaks of a well-ordered orthorhombic subcell structure, indicating the formation of a 1:1 molecular compound (MC). The crystallization (1° C./min) of the $0.5_{SOO}$ mixture followed by TR-XRD (FIG. 2A) showed that this mixture started crystallizing from the melt at 21.5° C. in the hexagonal subcell structure (characteristic reflection at 4.11 Å in FIG. 2A) and then transformed at 17.5° C. into an orthorhombic phase (signature peaks at 4.18 Å and 3.85 Å at 17.5° C. transformed gradually to 4.14 Å and 3.68 Å in the last scan in FIG. 2A). This latter phase is very close to the β'-form of SOO and is therefore labelled $\beta'_{MC}$.

As the sample was cooled from 21.5° C. to 15.0° C. during the polymorphic transformation, the (100) lateral d-spacing ($d_{100}$) of the α-form increased from 4.11 to 4.20 Å to accommodate the (110) and (200) planes of the new β'-structure (FIG. 2B). The accommodation ($d_{100}$ increase) coincided with the rapid decrease of $d_{200}$ (vertical dotted line in FIG. 2B), indicating that the transformation involved the closest neighboring molecules. After this rapid adjustment of the molecules to make the new crystal structure, the subcell ordered isotropically relatively slowly to reach its equilibrium values at −20° C. ($d_{200}$=3.68 Å and $d_{110}$=4.14 Å in FIG. 2B). The intensity of the reflections of the orthorhombic phase increased with cooling following a sigmoidal function and reached 95% of its plateau at ~8° C. (FIG. 2C) indicating that the accommodation and the formation of the MC in its final form was achieved in a relatively small temperature range (in less than 5° C.).

In all the SOO rich mixtures, the 4.11 Å and 3.65 Å peaks of the $\beta'_{MC}$-form were presented superimposed to the 4.18 Å and 3.75 Å reflections of SOO ($0.60_{SOO}$-$0.80_{SOO}$ mixtures in FIG. 1A). This indicates that the $\beta'_{MC}$-phase coexisted with both the $\alpha_1$-phase and β'-phase of SOO. Note that as the mixtures became richer in SOO, the peaks of $\beta'_{MC}$ decreased while those of the $\alpha_1$-phase increased, understandably because less MeS-SOO pairs were available to form MC crystals.

Small Angle X-Ray Diffraction and Lamellar Packing

The SAXD patterns of SOO/MeS mixtures measured at −40° C. are displayed in FIGS. 3A and 3B. The intensity of selected SAXD peaks are shown FIG. 3C.

MeS displayed a doublet series of sharp SAXD peaks (00l=2, 4, 6 and 8) with repeat units $d_{001}$ of 49.2 Å and 48.3 Å, indicative of a DCL structure of a tilted subcell. The pure SOO displayed one series of reflections with $d_{001}=61$ Å of a TCL structure, in agreement with previously reported data for the orthorhombic phase of SOO. The SAXD of the mixtures can be categorized into two groups separated at the $0.50_{SOO}$ mixture.

The first group of mixtures (<$0.50_{SOO}$) presented the DCL packing structure of MeS ($D_{001}=49$ Å) and two other different DCL structures attributed to mixed phases (fundamental reflections at $d_{001}=46.0$ Å and 42.0 Å in FIG. 3A) with corresponding (003) reflections at 15.5 Å, 13.8 Å, respectively, as well as other higher order reflections (FIG. 3B). The decrease with increasing SOO concentration of the intensity of the 00l reflections associated with the MeS monoclinic phase (exemplified by 12 Å (004)-curve in FIG. 3C) was concomitant with the increase of the intensity of the reflections of the mixed phases (46 and 42 Å in FIG. 3C). The 46.0 Å and 42.0 Å reflections were associated with the orthorhombic phases involving SOO. As the concentration approached the compound composition, the (00l) reflections with fundamental repeat unit of 42 Å became narrower and their intensity higher than those of the 46-Å reflections indicating the prevalence of the MC at the detriment of the MeS phase. The 42-Å reflection was therefore associated with the MC in the β'-form, and the 46-Å reflection was associated with a smaller mixed MeS-rich phase, both in the DCL structure. There was no pure SOO phase developed in the mixtures of this group since no peaks of its characteristic TCL packing were detected. It is reasonable to surmise that the small (001) repeat length (46 Å and 42 Å) was due to the MeS unit cell (packed in 49-Å units) accommodating SOO molecules in a 1:1 MC (in a 42-Å units) and in MeS-rich/SOO mixed (in a 46-Å units) structures.

The second group of mixtures ($\geq 0.50_{SOO}$) displayed a TCL packing structure similar to SOO with 001, 002 and 003 reflections at 61.0 Å, 30.0 Å and 15 Å, respectively (FIGS. 3A and 3B). This indicates that the β'-phase of pure SOO and the pseudo α-phase of SOO/MeS mixed phase as well as the $β'_{Mc}$-phase were packed in similar TCL structures. Such crystal structures were initiated by SOO templates which accommodated the MeS molecules in either the MC or the mixed SOO-rich phases. The similarity in chain length between the three structures can be explained by SOO providing sufficient space to host MeS. Note that there was no pure MeS phase detected in this group of mixtures.

The switch at the $0.50_{SOO}$ mixture of the crystal structure from subcells initiated by MeS to subcells initiated by SOO was attributable to the chain length structure of SOO which was practically double that of MeS, coupled with the geometric steric hindrances due to the asymmetric nature of SOO. It is suggested that once TCL SOO pairs are formed, it is easier for MeS to join in the packing but not when SOO is dissolved in MeS, in which case SOO pairs with MeS to form the MC directly. A proposed structure of MC of SOO/MeS is provided in FIGS. 4A and 4B. A TCL structure of pure SOO is also provided in FIG. 4C.

Example 3—Crystallization and Melting Behaviors

Crystallization Behaviors

The DSC cooling thermograms of the SOO/MeS mixtures are displayed in FIG. 5A. The cooling phase diagram of the binary system including $T_{on}$, $T_P$ and $T_{off}$ of crystallization is presented in FIG. 5B. MeS presented a single sharp and intense exotherm at ~33.3° C. ($P_o$ in FIG. 5A) with a loop due to the exothermic energy not being dissipated by the DSC in sufficient time for the signal to be temporally resolved. Such a signal was typical of the rapid growth of a very energetic single phase. SOO presented an extended and relatively weak leading peak at ~7° C. followed by a large exotherm at ~-7° C. (P1 and P3 in FIG. 5A, respectively) indicating a complex crystallization process. This transformation path was similar to what was previously reported for SOO wherein, the nucleation and slow growth of the low stability $β_2$-phase of OPO was followed by a rapid polymorphic transformation into the $β_1$-phase as well as the nucleation and strong growth of a higher melting temperature crystal phase, β'.

The effect of SOO on the crystallization of MeS was strong even at the lowest composition. SOO not only reduced the magnitude of the initial heat flow, it also shifted the onset temperature steadily to lower temperatures and triggered new transformations, thereby increasing the span of crystallization dramatically. The MeS-rich mixtures ($X_{SOO} \leq 0.40$) presented three notable exotherms ($P_M$, $P_L$, and $P'_3$ in FIG. 5A) having constant $T_P$ indicative of lines of transformations spanning to $0.40_{SOO}$ (lines $T_M$, $T_L$, and $T_{SOO}$ in FIG. 5B). With increasing SOO, the intensity of the first peak ($P_0$ in FIG. 5A) which was associated to the crystallization enthalpy of pure MeS, decreased linearly ($R^2=0.8979$, empty circle in FIG. 5B) while the enthalpy of $P_M$, the closest peak which appeared at ~23.0° C. just upon the addition of SOO (stars in FIG. 5B), increased linearly ($R^2=0.94985$, stars in FIG. 5C). This indicated the formation of a well-defined MeS-SOO mixed phase whose content increased at the detriment of the MeS phase.

The phase transformation indicated by $P'_3$ at $-5.5°$ C., appeared in concurrence with the MeS/SOO mixed phase, and the enthalpy corresponding to this peak also increased linearly with increasing SOO content ($R^2=0.9187$, filled squares in FIG. 5C), but at a much lower rate: 21.4 kJ/mol for $P'_3$ compared to 60 kJ/mol for P3. The intermediary peak ($P_L$ in FIG. 5A) was located at 10° C., and was paired with $P'_3$ in the same manner as was the leading peak of pure SOO ($P_1$) with its $P_3$ counterpart. The intensity of $P_L$ (filled triangle in FIG. 5C) increased in the same manner as $P'_3$. $P_L$ and $P'_3$ are therefore associated with the formation of another well-defined mixed phase whose phase trajectory mirrors the crystallization of SOO. Note that $P_L$ and $P'_3$ are only slightly higher than the $P_1$ and $P_3$ peaks of pure SOO.

The SOO-rich mixtures ($X_{SOO}>0.40$) presented relatively more complex transformation traces compared to the MeS-rich mixtures. The crystallization of these mixtures occurred with four notable exotherms ($P_1$, $P_L$, $P_2$ and $P_3$ in FIG. 5A) in a much smaller temperature range than the MeS-rich mixtures. $P_M$, the peak of the mixed phase, was notably absent in the thermograms of these mixtures. Furthermore, the peak temperatures of their exotherms varied with concentration contrary to those of the MeS-rich mixtures. When these peak temperatures were graphed with those of the MeS-rich mixtures (FIG. 5A), clear singularities appeared at the $0.40_{SOO}$ mixture. Also, except for $P_3$, the peak associated with the crystallization of SOO and which increased substantially as the molar ratio of SOO was increased, their intensity did not vary substantially.

The liquidus line in the crystallization phase diagram ($T_{On}$ or $T_P$ of the leading peak in FIG. 5B) is marked by a singularity at $0.30_{SOO}$ coupled with a horizontal transformation line expanding from $0.05_{SOO}$ to $0.30_{SOO}$ indicating a peritectic transformation.

The different crystallization behaviors delimited at the $0.40_{SOO}$ as illustrated with the thermograms of FIG. 5A and quantified in FIGS. 5B and 5C, are correlated with the XRD findings. The polymorphism of MeS-rich and SOO-rich mixtures was directly related to the transformation revealed by DSC, with a close match of the intensity of the XRD characteristic reflections with the enthalpy of corresponding peaks. The decrease of $P_O$ intensity and subsequent increase of $P_M$ intensity with increasing SOO concentration correlate very well with the increase of the orthorhombic phase content at the expense of the monoclinic phase of pure MeS. Hence the peritectic compound was associated with the MeS-rich mixed phase in the orthorhombic and DCL structure without any ambiguity. The exotherms $P_L$ and the $P'_3$ in mixtures ≤$0.40_{SOO}$ were associated with the MC and the compound/SOO mixed phases, respectively, both in the orthorhombic form and DCL structure. Note that the position of $P'_3$ and $P_L$ shifted to lower temperatures, indicating a decrease in crystal stability. $P_3$ was associated with pure SOO in the β'-form and TCL structure. The intensity of $P_3$ increased with increasing SOO, but its position remained unaffected indicating that it crystallized in the same stability form despite the presence of MeS or mixed phases. $P_2$ was associated with the compound in the orthorhombic form and TCL structure. This phase grew at the detriment of the $α_1$-phase of pure SOO, and as expected showed a maximum at $0.50_{SOO}$.

Melting Behavior

The DSC heating profiles of the SOO/MeS mixtures are shown in FIG. 6A. The corresponding kinetic phase diagram comprising the transition temperatures are presented in FIG. 6B. The liquidus line in the phase diagram is represented by the peak and offset temperature of the most stable crystals. As can be seen, two group of melting traces delimited by the $0.50_{SOO}$ mixture are presented in FIG. 6A, mirroring what was observed in the crystallization thermograms.

The mixture with $X_{SOO}$≥0.50 started with a strong exothermic event followed by a series of thermal transitions and complete melting all before 27° C., the melting temperature of SOO. Although the presence of MeS in this group of mixtures resulted in extra phase transformations, the overall melting profiles resembles that of SOO. Note that the strong crystallization mediated by melt of SOO at ~15° C. was hindered in the other mixtures of the group, probably because it was weaker than the overlapping melting events.

For the mixtures with $X_{SOO}$<0.50, and from the single endotherm of pure MeS, the addition of SOO induced a significant increase of the number of transitions (as much as 7 between exotherm and endotherms) and broadened the temperature transformation window. All the heating thermograms of these mixtures started with a small melting event at ~−2.5° C. followed by a broad exotherm at ~2° C. ($T_R$ in FIG. 6B) and ended with an increasingly weakening endotherm. This last endotherm decreased very rapidly with increasing SOO content and disappeared in the mixtures with more than 40% SOO (P1 in FIG. 6A).

A notable transformation line was presented at ~29° C. spanning from $X_{SOO}$>0 to 0.30, the concentration at which a singularity was observed in the liquidus line (arrow 1 in FIG. 6B). This was a clear indication of a peritectic transformation. These features in the heating phase diagram coincided with the peritectic transformation observed in the cooling phase diagram and indicated the reversibility of the transition. The peritectic transformation was usually induced by specific unlike-pair intermolecular interactions and was accompanied by the formation of so-called peritectic compound.

From the SOO side of the phase diagram, one can see that MeS significantly affected the transformation behavior of SOO, particularly in its ability to form the most stable crystals. The exotherm appearing in SOO at ~15.7° C. was overwhelmed as soon as MeS was added (FIG. 6A), and the β'$_1$-form of SOO (melting at 23° C.) was reduced dramatically and completely suppressed in the $0.70_{SOO}$ mixture. The melting point of the most stable phase was also shifted to a minimum, indicating strong colligative effects. These effects were illustrated in the liquid-solid boundary of the kinetic phase diagram by a sharp eutectic (eutectic concentration $X_E$=0.70) and a eutectic line (eutectic temperature $T_E$=15° C. in FIG. 6B). The eutectic was formed between SOO and the 1:1 MC rather than MeS.

Other solid-solid transformation lines in the kinetic phase diagram below the peritectic and eutectic lines were also visible in both sides of the stoichiometric 50/50 mixture ($T_S$, $T_R$ and $T_α$ in FIG. 6B). Note that the mixtures with $X_{SOO}$ below 0.20 presented a small peak above the peritectic at ~33° C. (indicated by the upward arrow in FIG. 6A) forming a line that indicated a possible metatectic transformation (not reported in FIG. 6B).

Thermodynamic Analysis of the Liquidus Line

The liquidus line in the binary phase diagram was constructed with $T_{off}$ (offset temperature of melting) as typically done in the study of lipid mixtures. Four segments, delimited by the singularities in experimental liquidus line, i.e., the peritectic point, the MC and the eutectic point, were considered for the fit to Eq. 2. The calculated and experimental liquidus lines are shown in FIG. 6B. The results of the fit are listed in Table 1. The fit was excellent with $R^2$ values all higher than 0.99875, residuals smaller than 3%, and RMSD less than 0.5. The peritectic, MC and eutectic points have been confirmed at $0.25_{SOO}$, $0.54_{SOO}$ and $0.70_{SOO}$, respectively.

The fit yielded the highest negative value for ρ in the MeS rich region where the peritectic transformation occurred, indicating that the formation of unlike molecular pairs was most favorable in this region of the phase diagram. The value of ρ for the SOO-rich eutectic segment, which although also negative was ~4 times smaller than that of the MeS-rich peritectic segment, indicating that the formation of unlike pairs with the MC was much less favorable. One can notice that close to the eutectic region where the MC dominates (segment III), the value of ρ was slightly positive indicating weak repulsive forces between unlike molecules, and a miscibility dominated by a behavior close to ideal. The negative value of ρ in segment II also indicated that unlike pair formation was favorable in this region of the phase diagram, but not as much as in the peritectic mixtures.

Microstructure Development of the SOO/MeS Mixtures

The final microstructures of the SOO/MeS mixtures captured by PLM at −90° C. are displayed in FIGS. 7A-L. The induction temperatures determined at the observation of the first white spot in the PLM are shown in FIG. 8. Note that the smallest structures observable in the PLM (~0.5 μm) are significantly larger than nuclei due to the limitation induced by light diffraction. Also because of differences in the size and shape of the samples, PLM induction temperatures can be compared to but are not the same as the DSC onset of crystallization. Nonetheless, the singularities that are observed at $0.20_{SOO}$, and $0.50_{SOO}$ in the PLM induction temperature versus SOO molar ratio (arrows 1 and 2, respectively, in FIG. 8) correspond to the peritectic and MC singularities of the liquidus line in the DSC cooling phase diagram.

Pure MeS started crystallizing at relatively high temperature (36.0±0.5° C.), and crystallized completely within a fraction of a second. Only one crystal was detected in the PLM slide, suggesting that it developed from a single nucleus. The very large crystal of MeS (>6000 μm) developed radially from the nucleus into a palm leaf-like structure, forking along the growth direction FIG. 7A. The crystallization of pure SOO was very slow compared to MeS. SOO started to form small fibril like microstructures at ~8.5±0.5° C. and completed its crystallization at very low temperatures (~−70° C.).

The typical microstructure of MeS was dramatically altered by the addition of SOO. As the concentration of SOO was increased, the number, shape, size, homogeneity and distribution of the microstructures were dramatically changed. Similar to SOO, all the SOO/MeS mixtures displayed different microstructures at different steps of crystallization. The MeS-rich mixtures (<$0.40_{SOO}$) displayed two types of microstructures. The crystallization of these mixtures started with the formation and rapid (30 s or 0.5° C. drop in temperature) development of entities whose nucleation and spherulitic growth mode was reminiscent of the large leaf-like microstructures of MeS, followed within 30 s to 1 min by the formation of fibril-like microstructures. This secondary nucleation was continuous and fast. The fibrils developed fully within 2 to 3 min after they appeared.

The neat and smooth appearance of the leaflets of the MeS microstructures was lost (see for example PLM of the $0.10_{SOO}$ mixture in FIG. 7B, and their size decreased and their number increased (PLM of the $0.20_{SOO}$ mixture in FIG. 7B), indicating a strong effect of SOO on the nucleation and growth rate of the crystals of the MeS-rich phase. For example, three- to four distorted spherulitic microstructures filling about 80% of the PLM slide were observed in the $0.10_{SOO}$ mixture. The growth of these spherulites was complete in about one minute. The PLM of the $0.25_{SOO}$ to $0.40_{SOO}$ mixtures (FIGS. 7D-F) was different because of the dramatic drop in the number and size of the spherulitic microstructures. For example, these crystals were dispersed in 15 to 20% of the whole PLM slide area in the $0.25_{SOO}$ mixture (FIG. 7D) and did not appear in the $0.40_{SOO}$ mixture (FIG. 7F). The PLM data indicate that along the increasing nucleation rate, the growth rate of these entities was reduced as SOO was added.

The formation of spherulitic and fibril-like microstructures in the MeS-rich mixtures can be related respectively to the DSC crystallization peak of the MeS phase ($P_O$)) and the shoulder peak ($P_M$) of a well-defined MeS-SOO mixed phase which followed very shortly. The number of fibril-like microstructures increased with increasing SOO at the detriment of the spherulitic microstructure in accordance to the variation of $P_M$ and $P_O$, respectively. Furthermore, the presence of the spherulites coincided with the monoclinic phase of MeS, confirming the above association.

The $0.50_{SOO}$ mixture displayed two types of microstructures, fibril-like entities developed in the primary stage (at ~19° C.) and small spherulites formed later (~13° C.). These two different microstructures share the same orthorhombic subcell structure as it was the only form that was detected for this composition at the completion of the crystallization. This interesting finding can be explained with the temperature/time resolved WAXD (FIG. 2A) which revealed that the $0.50_{SOO}$ mixture started crystallizing in the hexagonal form ($\alpha$-form) then slowly transformed into the higher stability orthorhombic form ($\beta'$-form). The time-lapse PLM showed that the spherulitic crystals developed from the melt at a temperature where the intensity of the characteristic peaks of the orthorhombic subcell increased dramatically (between 16–10° C.). Furthermore, both fibril-like and spherulitic microstructures continued to develop during cooling in this temperature range. Therefore, it is possible that the orthorhombic crystals which transformed from the hexagonal phase (solid-solid transformation) retained the initial fibril like microstructure, and the spherulitic microstructure were formed by an orthorhombic phase which developed directly from the melt. The two crystal developments could not be discriminated directly in the TR-XRD of the $0.50_{SOO}$ mixture because the XRD peaks of the same crystal phase occurred at the same position. It is also possible that it was only at the lower temperature where the spherulites were observed that nano-sized single domains have enough energy to form these new microstructures. The mixtures in the $0.50>X_{SOO}<0.80$ range displayed similar fibril-like microstructures irregularly dispersed over a cloudy background (FIGS. 7G-K). The SOO-richer mixtures ($X_{SOO}>0.80$) displayed only fibril like microstructures (FIG. 7L). This indicated that the material was still not fully crystallized at low temperature as was observed in the XRD. The number of these microstructures increased in mixtures with $X_{SOO}$ higher than 0.80, indicating their close relation to SOO.

Effect of Asymmetry of TAG on FAME/TAG Phase Behavior

Symmetry and stereospecificity is known to be an important structural element for the selection of the phase trajectory and polymorphism of TAGs. The symmetry of the TAG additive was therefore expected to be a significant parameter in the phase behavior of TAG/FAME binary systems. The effect of symmetry of the TAG on the transformation path, polymorphism and microstructure of TAG/FAME binary systems can be understood in view of the differences in the phase behavior between the two TAGs, and by contrasting the present work with the findings of previous MeS/OSO studies. SOO is known to nucleate and form crystals faster than OSO, but takes longer to reach equilibrium. SOO packs predominantly in pseudo-hexagonal phases and also in $\beta'$-phases both in the TCL structure; whereas, OSO crystallizes equally in pseudo-$\alpha$ and $\beta'$-subcells, both in the DCL structure. Under the same thermal treatment, SOO displayed a similar fibril like microstructure to SOO, but in a denser network.

SOO as well as OSO formed a 1:1 MC with MeS. However, the OSO/MeS compound formed a eutectic with both pure MeS ($X_{E1}=0.49_{OSO}$) and pure OSO ($X_{E2}=0.84_{OSO}$) when SOO/MeS compound formed one eutectic with pure SOO ($X_E=0.70_{SOO}$) and a peritectic with pure MeS ($X_P=0.25_{SOO}$). The noticeable phase behavior of SOO/MeS mixtures was related to the distinctiveness of the SOO:MeS compound, which was developed because of the asymmetry of SOO. During crystal packing, because of this asymmetry, the unsaturated fatty acid on the sn-2 position comes close to the saturated fatty acid on the sn-1 position, and aligns in a way so as to reduce the repulsion due to the geometric steric hindrance presented by the kink and optimizes crystal energy. The most stable phase available for the SOO:MeS compound was the orthorhombic subcell structure, contrary to the OSO:MeS compound which achieved a triclinic subcell packing, because of the much less hindrance due to the availability of its stearic moiety at the sn-2 position for tighter packing.

The peritectic transformation that occurred with SOO and not OSO can also be explained by symmetry considerations, i.e., the disposition of the oleic moieties about the ester group. In the MeS-rich mixtures and in the liquid state, because of the asymmetry, SOO presents its unsaturated oleic acids on both sides of its glycerol backbone and accommodates the MeS-MeS dimers to form the lamellas that seed a peritectic transformation. Note the formation of dimers of fatty acid esters in the liquid phase was evidenced previously. On the other hand, the dimers of MeS face two unsaturated fatty acids on one side and two saturated fatty acids on the other side of an OSO/MeS compound. This triggered strong enough repulsion from the two unsaturated fatty acids so that the formation of MeS lamellas in the MeS-rich mixtures are more favorable than mixed MeS/OSO other than the compound, leading to colligative effects that may explain the formation of a eutectic between the compound and MeS.

The difference in position of the oleic acids about the stearic moiety also explain the differentiated effect of concentration on the crystal chain packing structure on the SOO:MeS and OSO:MeS compounds. Due to these structural features, the stacking of the SOO:MeS compound was much more easily influenced by its molecular environment (MeS and SOO) than the OSO:MeS compound by MeS and OSO. In the SOO/MeS system, the DCL structure of the MC was promoted in the MeS rich side of the phase diagram, and the TCL in the SOO-rich side, indicating a key difference in interaction under different environments. Similar influences were not observed on the chain length stacking of the OSO:MeS compound where similar DCL packing was achieved independently of concentration.

The formation of two types of chain length structure for the SOO/MeS compound (a DCL in the MeS rich region and TCL in SOO-rich mixtures) was suggested as a cause of the occurrence of a peritectic and a eutectic transformation. Similar considerations of chain length structure in the OSO/MeS system, in which the compound displayed a DCL packing in both MeS-rich and OSO-rich regions, can explain the two eutectics.

Both SOO/MeS and OSO/MeS systems displayed similar microstructure developments, driven primarily by the influence of the TAG. In the MeS-rich mixtures of both systems, the TAG distorted the large spherulites of the monoclinic phase of MeS and dramatically reduced their size, and in the TAG (OSO or SOO)-rich region both systems displayed fibril like microstructures. However, the number density of the crystals (spherulites or fibrils) was much larger and their size much smaller in the SOO/MeS mixtures than in the OSO/MeS counterparts, resulting in denser solid networks. A surprising effect of symmetry manifested in the microstructure of the MCs of the systems. Because of the way the SOO:MeS compound nucleated from the melt into its orthorhombic phase, it formed both fibril-like and spherulitic microstructures; whereas the OSO:MeS compound formed fibril like microstructures only.

To review, a complete phase diagram of SOO/MeS binary system encompassing thermal transitions, crystal structure and microstructure was constructed for the first time. The SOO/MeS mixtures presented a SOO:MeS molecular compound (MC) which participated with MeS and SOO in the formation of a peritectic and a eutectic, respectively. In fact, the phase behavior of the SOO/MeS system is directly related to the asymmetry of SOO and the resulting distinct structure of the MC. The peritectic line occurred in the MeS rich side 12° C. below the melting point of pure MeS, but resulted in relatively large crystals although much smaller than the MeS microstructures. The phases at the eutectic point presented a depression in the crystallization and melting points as large as 25° C., and a microstructure with very small crystals, all desirable attributes for an improved low temperature flow. The deep eutectic in the SOO rich side was promoted by strong colligative effects. Also, one can notice that close to the eutectic region where the MC dominates, the miscibility behavior was close to ideal, with weak repulsive forces between unlike molecules contrary to peritectic MeS-rich side where the formation of unlike molecular pairs was favored.

Accordingly, the findings demonstrate that TAGs as described herein, such as SOO, when combined with biodiesels can improve the cold flow performance of biodiesel.

The foregoing detailed description and accompanying figures provided a fundamental understanding necessary to optimize the use of structured additives for the improvement of the cold flow behavior of biodiesel through suppression of crystallization and reduction of crystal size. Moreover, the foregoing detailed description and accompanying figures have been provided by way of explanation and illustration, and are not intended to limit the scope of the disclosure. Many variations in the present embodiments illustrated herein will be apparent to one of ordinary skill in the art, and remain within the scope of any current or future claims and their equivalents.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term

TABLE 1

Temperature and enthalpy parameters $T_s$ and $\Delta H_s$ used to simulate the liquidus line (Eq. 1), and resulting non-ideality of mixing parameter ρ.

| Segment | Region | $T_s$ (K) | $\Delta H_s$ (kJ/mol) | ρ (kJ/mol) |
|---|---|---|---|---|
| I | $0 \leq X_s \leq 0.25$ | 313.5 ± 0.5 | 72 | −23.0 |
| II | $0.25 \leq X_s \leq 0.50$ | 308.5 ± 0.5 | 61 | −7.5 |
| III | $0.55 \leq X_s \leq 0.70$ | 294.0 ± 0.3 | 65 | 4.0 |
| IV | $0.70 \leq X_s \leq 1.0$ | 298.3 ± 0.3 | 65 | −6.0 |

The invention claimed is:

1. A biodiesel crystallization depressant composition comprising a triacylglycerol and a biodiesel fuel, wherein the triacylglycerol comprises 1,2-dioleoyl-3-stearoyl glycerol and wherein the 1,2-dioleoyl-3-stearoyl glycerol is mixed with the biodiesel fuel comprising methyl stearate to a desired molar fraction, $X_{SOO}$, where X ranges from greater than 0 to 1.0, and further wherein the 1,2-dioleoyl-3-stearoyl glycerol begins crystallization depression from inception of mixing to a maximum crystallization depression at molar fraction $0.70_{SOO}$.

2. The composition of claim 1, wherein the mixture of the 1,2-dioleoyl-3-stearoyl glycerol and the methyl stearate comprises one eutectic at $0.70_{SOO}$, one peritectic $0.25_{SOO}$ and a 1:1 compound mixture at $0.54_{SOO}$.

3. The composition of claim 2, wherein the mixture of the 1,2-dioleoyl-3-stearoyl glycerol and the methyl stearate comprises a eutectic at molar fraction $0.70_{SOO}$, wherein an average crystal size is less than 20 μm at $0.70_{SOO}$.

4. The composition of claim 2, wherein the mixture of the 1,2-dioleoyl-3-stearoyl glycerol and the methyl stearate comprises a peritectic at molar fraction $0.25_{SOO}$, wherein an average crystal size is less than 250 μm at $0.25_{SOO}$.

5. The composition of claim 1, wherein at a molar fraction $0.70_{SOO}$, the composition begins crystallization at 15° C. and completes crystallization at −17° C.

6. The composition of claim 1, wherein from molar fraction $0.05_{SOO}$ to molar fraction $0.50_{SOO}$, the mixture of the 1,2-dioleoyl-3-stearoyl glycerol and the methyl stearate comprises monoclinic and orthorhombic forms.

7. The composition of claim 6, wherein the monoclinic form decreases from molar fraction $0.05_{SOO}$ to disappear at molar fraction $0.50_{SOO}$.

8. The composition of claim 1, wherein from molar fraction $0.50_{SOO}$ to molar fraction $1.0_{SOO}$, the mixture of the 1,2-dioleoyl-3-stearoyl glycerol and the methyl stearate comprises orthorhombic forms wherein the content of the orthorhombic forms increase to a maximum at the eutectic composition at molar fraction $0.70_{SOO}$.

9. The composition of claim 3, wherein at the eutectic at molar fraction $0.70_{SOO}$, the mixture of the 1,2-dioleoyl-3-stearoyl glycerol and the methyl stearate comprises a fibril-like crystal network.

10. The composition of claim 4, wherein at the peritectic at molar fraction $0.25_{SOO}$, the mixture of the 1,2-dioleoyl-3-stearoyl glycerol and the methyl stearate comprises granular microstructure with distorted spherulitic entities.

11. The composition of claim 1, wherein at a 1:1 compound mixture, the mixture forms a network made of fibril-like and spherulitic entities.

12. A biodiesel crystallization depressant composition comprising (i) a triacylglycerol comprising 1,2-dioleoyl-3-stearoyl glycerol and (ii) a biodiesel fuel comprising methyl stearate, wherein components (i) and (ii) are present in a desired molar fraction, $X_{SOO}$, where X ranges from greater than 0 to 1.0, and further wherein the 1,2-dioleoyl-3-stearoyl glycerol begins crystallization depression from $0.01_{SOO}$ to a maximum at molar fraction of $0.70_{SOO}$.

* * * * *